United States Patent
Hashimoto

[19]

[11] Patent Number: 5,868,450
[45] Date of Patent: Feb. 9, 1999

[54] REAR SEAT APPARATUS FOR A VEHICLE

[75] Inventor: Kazunori Hashimoto, Toyota, Japan

[73] Assignee: Toyota Jidosha Kabushiki Kaisha, Japan

[21] Appl. No.: 717,095

[22] Filed: Sep. 20, 1996

[30] Foreign Application Priority Data

| Sep. 22, 1995 | [JP] | Japan | 7-244875 |
| Dec. 20, 1995 | [JP] | Japan | 7-332240 |
| Feb. 14, 1996 | [JP] | Japan | 8-26746 |

[51] Int. Cl.$^6$ ..................................................... B60N 2/12
[52] U.S. Cl. .................................. 296/65.09; 296/65.13; 296/69; 296/68.1; 297/325; 297/394
[58] Field of Search ............................... 296/65.1, 64, 69, 296/66, 68.1; 297/15, 325, 326, 327, 328, 335, 344.12, 317, 322, 344.1, 344.15, 391, 394, 403; 16/233, 235, 249, 362, 363

[56] References Cited

U.S. PATENT DOCUMENTS

| 4,191,417 | 3/1980 | Ferrara . |
| 4,227,736 | 10/1980 | Lebault et al. . |
| 4,368,916 | 1/1983 | Blasin ..................................... 297/341 |
| 4,475,763 | 10/1984 | Hamatani et al. . |
| 4,512,609 | 4/1985 | Parsson . |
| 4,637,653 | 1/1987 | Yoshida et al. . |
| 4,699,418 | 10/1987 | Plavetich . |
| 4,869,541 | 9/1989 | Wainwright . |
| 4,932,706 | 6/1990 | Wainwright . |
| 4,932,709 | 6/1990 | Wainwright . |
| 4,971,395 | 11/1990 | Coussemacq et al. . |
| 5,044,683 | 9/1991 | Parsson . |
| 5,240,302 | 8/1993 | Yoshida et al. . |
| 5,275,370 | 1/1994 | Terai ..................................... 296/65.1 |

FOREIGN PATENT DOCUMENTS

| 0 022 691 | 1/1981 | European Pat. Off. . |
| 0 336 819 | 3/1989 | European Pat. Off. . |
| 0 432 824 | 6/1991 | European Pat. Off. . |
| 43 40 446 | 7/1995 | Germany . |
| 59-14530 | 1/1984 | Japan ..................................... 297/403 |
| 3-189245 | 8/1991 | Japan . |
| 3-125625 | 12/1991 | Japan . |
| 5-85242 | 4/1993 | Japan . |
| 406327535 | 11/1994 | Japan ..................................... 297/403 |

*Primary Examiner*—D. Glenn Dayoan
*Assistant Examiner*—Jason Morrow
*Attorney, Agent, or Firm*—Pillsbury Madison & Sutro, LLP

[57] ABSTRACT

A rear seat apparatus for a vehicle is disposed on a rear elevated portion of a stepped floor of the vehicle. At least a rear seat cushion of the rear seat apparatus is allowed to swing toward the front of the vehicle from a horizontal seating state, in which a passenger may sit on the rear seat cushion. The rear seat apparatus has a connection mechanism for connecting the rear seat cushion to the rear elevated portion of the floor. The connection mechanism allows the rear seat cushion to be moved by approximately 90 degrees toward the front of the vehicle and then slid downward so as to be brought into an upright state, in which a front portion of the rear seat cushion is held on a front lower-level portion of the floor. The connection mechanism also allows the rear seat cushion to be moved by approximately 180 degrees from the seating state toward the front of the vehicle so as to be brought into an overturned state.

23 Claims, 27 Drawing Sheets

FIG.9
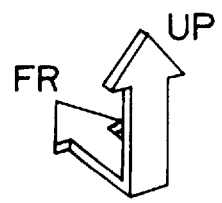
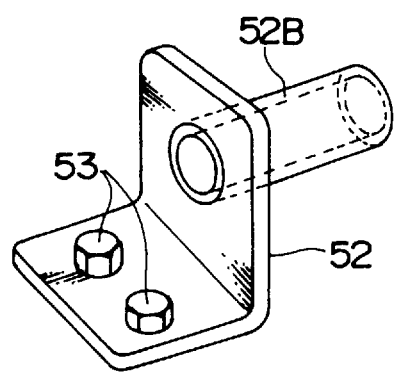

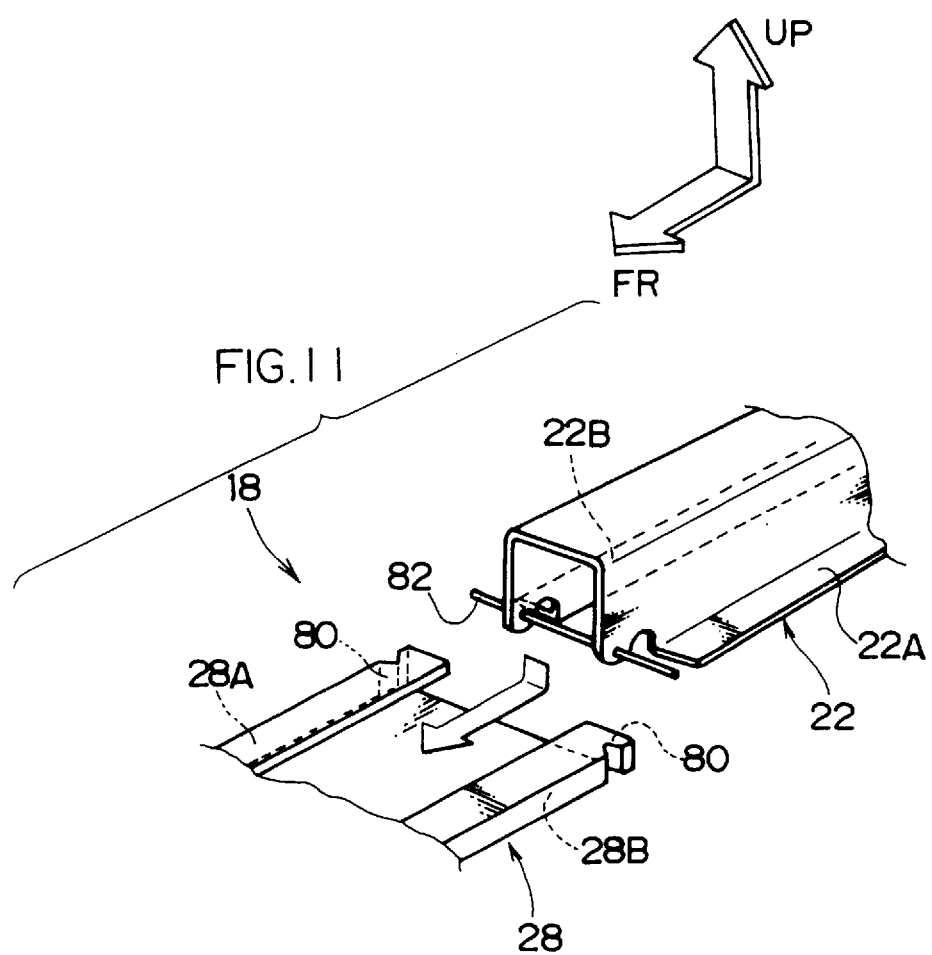

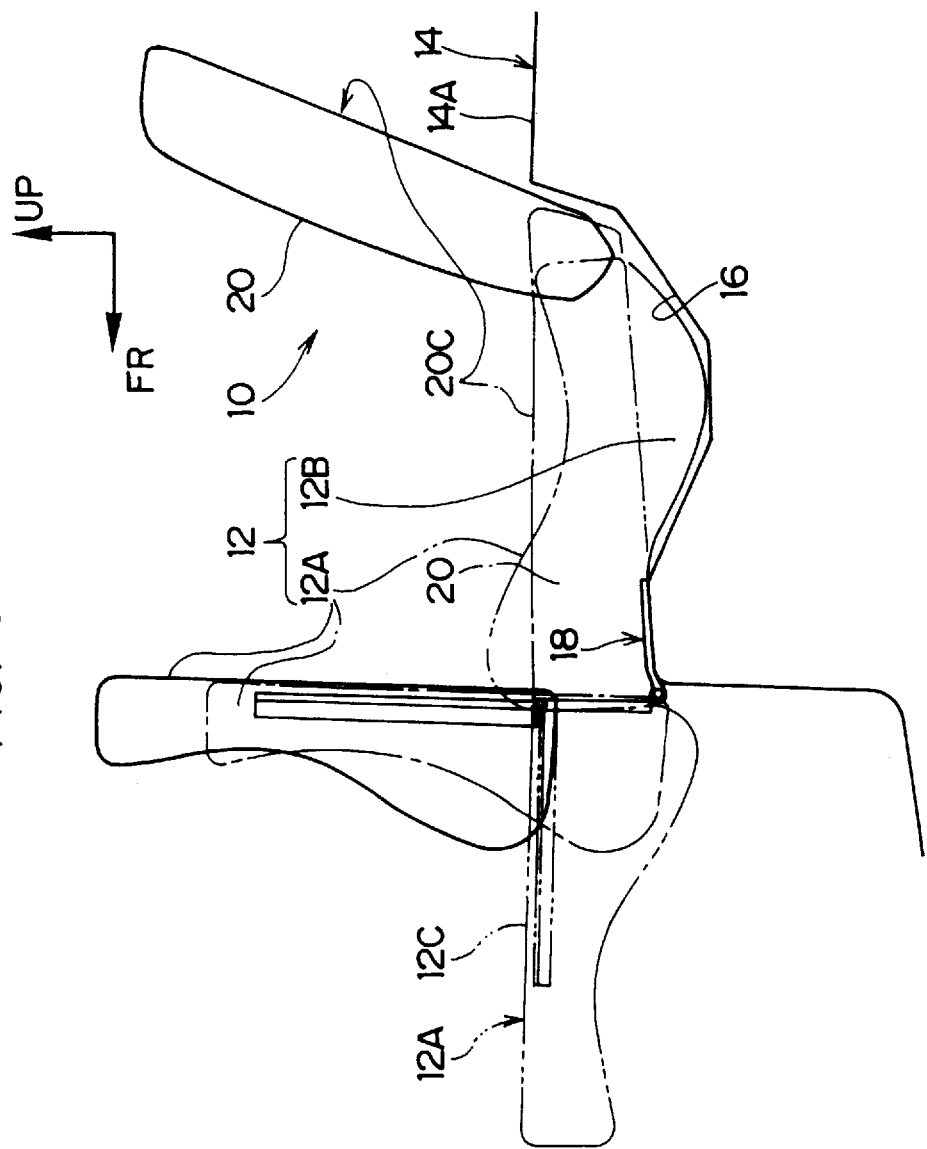

REAR SEAT APPARATUS FOR A VEHICLE

BACKGROUND OF THE INVENTION

1. Field of the Invention

The present invention relates to a rear seat apparatus for a vehicle, and particularly to a rear seat apparatus for a vehicle disposed on the elevated rear portion of a stepped floor of the vehicle.

2. Description of the Related Art

A conventional rear seat apparatus for a vehicle, which is disposed on the elevated rear portion of a vehicle floor, has a structure disclosed, for example, in Japanese Patent Application Laid-Open (JP-A) No. 3-189245.

As shown in FIG. 26, in the conventional rear seat apparatus for a vehicle, a rear seat 90 is composed of a seat cushion 91 and a seat back 92. The seat back 92 can swing toward the front of a vehicle (in the direction of arrow S1 in FIG. 26), pivoting on a first hinge 93. The seat cushion 91 is connected at a front bottom portion 91A thereof to a vehicle floor 96 by means of an L-shaped link arm 94, thereby allowing it to swing toward the front of the vehicle (in the direction of arrow S2 in FIG. 26).

In this rear seat apparatus, when the seat cushion 91 and the seat back 92 are swung forward to respective positions shown in FIG. 27, a rear surface 92A of the seat back 92 serves as an article supporting surface on which an article 98 is placed.

However, in this rear seat apparatus, as shown in FIG. 27, when the seat cushion 91 is in an upright state, a clearance 99 is formed between the seat back 92 and the seat cushion 91, making it difficult to provide a spacious luggage room with a flat floor.

Also, in this rear seat apparatus, when the vehicle receives an impact from its front end in the state in which the seat cushion 91 stands upright with the article 98 being placed on the rear surface 92A of the seat back 92 as shown in FIG. 27, the article 98 will move forward (in the direction of arrow Y in FIG. 27) and hit against the seat cushion 91. When the article is already in contact with the seat cushion 91 (as represented by a two dots-and-dash line in FIG. 27), an inertial force of the article 98 acts on the seat cushion 91. Accordingly, in order to reliably prevent the seat cushion 91 from moving forward due to a thrust of the article 98, it is necessary to sufficiently reinforce the link arm 94 supporting the seat cushion 91, a support portion for the link arm 94, a front seat 99, and the like, resulting in a significant increase in weight.

SUMMARY OF THE INVENTION

In view of the foregoing fact, an object of the present invention is to provide a rear seat apparatus for a vehicle capable of providing a spacious luggage room with a flat floor.

Another object of the present invention is to provide a rear seat apparatus for a vehicle capable of improving the maneuverability of a rear seat cushion when the rear seat cushion is swung toward the front of the vehicle.

According to a first aspect of the present invention, there is provided a rear seat apparatus for a vehicle disposed on a rear elevated portion of a stepped floor of the vehicle and allowing at least a rear seat cushion, which is a portion of the rear seat apparatus, to swing toward the front of the vehicle from a horizontal seating state, in which a passenger may sit on the rear seat cushion. This rear seat apparatus includes a connection mechanism which connects the rear seat cushion to the rear elevated portion of the floor so as to allow the rear seat cushion to be moved between its seating state and its upright state or overturned state. That is, the connection mechanism allows the rear seat cushion to be moved by approximately 90 degrees from the seating state toward the front of the vehicle and then slide downward so that the rear seat cushion is brought into the upright state. In the upright state, the front portion of the rear seat cushion is held on a front lower-level portion of the floor of the vehicle. The connection mechanism also allows the rear seat cushion to be moved by approximately 180 degrees from the seating state toward the front of the vehicle so as to be brought into an overturned state.

Accordingly, through the connection mechanism, the rear seat cushion swings by approximately 90 degrees from the seating state toward the front of the vehicle and then slides downward so that the rear seat cushion is brought into the upright state. The rear seat cushion also swings by approximately 180 degrees from the seating state toward the front of the vehicle so that it is overturned to enter the overturned state.

Thus, a spacious luggage room with a flat floor is obtained, and the seat layout can be modified according to how a passenger is seated. Also, the upright state facilitates loading/unloading an article over the upright rear seat cushion from the front seat side.

According to a second aspect of the present invention, in the rear seat apparatus for a vehicle according to the first aspect, the connection mechanism is a rotary slide mechanism disposed at the floor and the rear seat cushion. The rotary slide mechanism is composed of a rail mounted to the rear seat cushion, a lower plate mounted on the floor, a rail guide plate for guiding the rail, and connection means for pivotably connecting the front end portion of the rail guide plate with the front end portion of the lower plate.

Accordingly, the connection mechanism allows the rear seat cushion to swing by approximately 90 degrees from the seating state toward the front of the vehicle and then slide downward so that the rear seat cushion is brought into the upright state. The connection mechanism also allows the rear seat cushion to swing by approximately 180 degrees from the seating state toward the front of the vehicle so that it is overturned to enter the overturned state. Thus, diversified seat layouts are available through a simple structure.

According to a third aspect of the present invention, in the rear seat apparatus for a vehicle according to the first or second aspect, a rear seat back is hinged to the rear seat cushion. Thus, the rear seat back can be folded onto the rear seat cushion, or can, together with the rear seat cushion, be brought into the upright state or the overturned state.

Accordingly, the hinge allows the rear seat back to be folded onto the rear seat cushion from the normal upright state and to, together with the rear seat cushion, be brought into the upright state or the overturned state while the folded state being maintained. Thus, diversified seat layouts are available.

According to a fourth aspect of the present invention, in the rear seat apparatus for a vehicle according to the first or second aspect, the rear seat back is hinged to the vehicle body. Thus, the rear seat back can be folded onto the rear portion of the floor when the rear seat cushion is in the upright state or the overturned state.

Accordingly, the hinge allows the rear seat back to be folded onto the rear portion of the floor from the normal upright state when the rear seat cushion is in the upright state or the overturned state. Thus, diversified seat layouts are available.

According to a fifth aspect of the present invention, in the rear seat apparatus for a vehicle according to the first or second aspect, changeover means is provided for selectively hinging the rear seat back to one of the rear seat cushion and the body of the vehicle.

Accordingly, the changeover means allows the rear seat back to be selectively hinged to one of the rear seat cushion and the body of the vehicle. Thus, diversified seat layouts are available.

According to a sixth aspect of the present invention, in the rear seat apparatus for a vehicle according to the fifth aspect, the rear seat back is divided into a right divisional portion and a left divisional portion, and the changeover means allows these portions to swing independently of each other.

Accordingly, the right and left divisional portions of the rear seat back swing independently of each other through the changeover means. Thus, diversified seat layouts are available.

According to a seventh aspect of the present invention, in the rear seat apparatus for a vehicle according to the second aspect, the rotary slide mechanism has second connection means for pivotably connecting the rear end portion of the rail guide plate and the front end portion of the rail.

Accordingly, the rotary slide mechanism allows the rear seat cushion to be swung by approximately 90 degrees from the seating state toward the front of the vehicle. Subsequently, the rear seat cushion is lifted upward. The second connection means allows the lifted rear seat cushion to be swung by approximately another 90 degrees toward the front of the vehicle. Thus, diversified seat layouts are available.

According to an eighth aspect of the present invention, in the rear seat apparatus for a vehicle according to the seventh aspect, one end of the overturned rear seat cushion is supported by a headrest inserted into a guide portion for insertion of a headrest stay provided at the lower portion of a front seat.

Accordingly, one end of the overturned seat cushion is supported by the headrest inserted into the guide portion for insertion of a headrest stay provided at the lower portion of the front seat. Thus, it is unnecessary to additionally provide means for supporting the overturned rear seat cushion, and diversified seat layouts are available.

According to a ninth aspect of the present invention, in the rear seat apparatus for a vehicle according to the third aspect, a guide portion for insertion of a headrest stay is provided at the rear end portion of the rear seat cushion as well as at the upper portion of the rear seat back. When the rear seat cushion and the rear seat back are swung together by approximately 180 degrees toward the front of the vehicle to enter the overturned state, the stay of the headrest can be inserted into both guide portions.

Accordingly, when an article carried behind the front seat moves forward due to the vehicle receiving an impact from its front end, the article is received by the headrest inserted into the guide portions provided at the rear end portion of the rear seat cushion as well as at the upper portion of the rear seat back. Since the two guide portions are provided, a strength of holding the headrest increases accordingly. The guide portions and the headrest inserted thereinto function as a simple lock for the overturned rear seat cushion and the rear seat back. Also, diversified seat layouts are available.

According to a tenth aspect of the present invention, in the rear seat apparatus for a vehicle according to the ninth aspect, the rear surface of the headrest has a shape corresponding to the shape of the rear surface of a front seat back.

Accordingly, the rear surface of the headrest inserted into the guide portion for insertion of a headrest stay contacts closely the front seat back, thereby providing a spacious luggage room behind the front seat.

According to an eleventh aspect of the present invention, in the rear seat apparatus for a vehicle according to the second aspect, the rail and the rail guide plate has a substantially U-shaped cross-section whose opening faces downward when the rear seat cushion is in the seating state. Both end portions of the rail, which define the opening, are bent upward so as to project upward beyond bottom ends of the sliding portion of the rail guide plate, thereby forming respective bent portions such that the rail guide plate is slidably housed within the rail.

Usually, grease is applied to the sliding surface between the rail and the rail guide plate which is effective in the seating state and to that which is effective in the 180-degree overturned state. Since grease is applied to the inner surface of the rail and as mentioned above both end portions of the rail are further bent upward so as to project upward beyond the corresponding bottom ends of the sliding portion of the rail guide plate, grease is less likely to leak out.

According to a twelfth aspect of the present invention, in the rear seat apparatus for a vehicle according to the eleventh aspect, a protector is temporarily attached to each of widthwise peripheral surfaces of said rail. The protectors are sandwiched between the rail and a seat frame together with a seat covering for covering a cushion pad formed integrally by foaming with the seat frame. The rail is fixed to the seat frame by fixing means.

Accordingly, the protector can be fixed reliably to the rail, and the seat facing can also be mounted reliably. Further, the protector protects the rail.

According to a thirteenth aspect of the present invention, in the rear seat apparatus for a vehicle according to the twelfth aspect, the front wall of the protector restricts the movement of the front end of the rail.

Accordingly, the front wall of the protector prevents grease from leaking out from the front end portion of the rail.

According to a fourteenth aspect of the present invention, there is provided a rear seat apparatus for a vehicle disposed on a rear elevated portion of a stepped floor of the vehicle, wherein at least a rear seat cushion is adapted to be moved by approximately 90 degrees from the seating state toward the front of the vehicle and then slide downward so that the rear seat cushion is brought into the upright state, in which the front portion of the rear seat cushion is held on a front lower-level portion of the floor of the vehicle, and the rear seat cushion is also allowed to be moved by approximately 180 degrees from the seating state toward the front of the vehicle so that the rear seat cushion is overturned to enter the overturned state. A rotary slide mechanism is provided so as to connect the rear seat cushion and the rear portion of the floor. The rotary slide mechanism has stopper means for preventing the rear seat cushion from sliding downward when it is swung by approximately 90 degrees, and canceling means for canceling the prevention of sliding of the rear seat cushion so that it can slide downward.

Accordingly, when the rear seat cushion is swung by approximately 90 degrees toward the front of the vehicle, it is possible to prevent the rear seat cushion from sliding downward by the stopper means. This facilitates the handling of the rear seat cushion when it is being swung toward the front of the vehicle.

According to a fifteenth aspect of the present invention, in the rear seat apparatus for a vehicle according to the fourteenth aspect, the rotary slide mechanism includes a rail and an upper plate which are both attached to the rear seat cushion, a lower plate attached onto the floor, connection means for pivotably connecting a front end portion of the upper plate and a front end portion of the lower plate, an upper plate cover, and two lower plate covers. The upper and lower plate covers cover a hinge portion which is located in a vicinity of the connection means and at which the upper plate and the lower plate are hinged together.

According to a sixteenth aspect of the present invention, in the rear seat apparatus for a vehicle according to the fifteenth aspect, the canceling means is a chamfered portion provided on each of the two lower plate covers.

According to a seventeenth aspect of the present invention, in the rear seat apparatus for a vehicle according to the fifteenth aspect, the stopper means is an operating portion which is provided on one of the two lower plate covers so as to provide relative rotation between the two lower plate covers.

According to the fifteenth to seventeenth aspects, by rotating one lower plate cover using the operating portion, the chamfered portions of both lower plate covers are aligned with each other. When the rear seat cushion is swung by approximately 90 degrees toward the front of the vehicle is this state, the rear seat cushion can slide downward. When the lower plate cover is rotated using the operating portion such that the chamfered portions of both lower plate covers are shifted from each other, the rear seat cushion is prevented from sliding downward when the rear seat cushion is swung by approximately 90 degrees toward the front of the vehicle.

The stopper and canceling means are simple in structure and facilitate the handling of the rear seat cushion when it is being swung toward the front of the vehicle. The upper plate cover and the two lower plate covers prevent the legs of a passenger from abutting directly the hinge portion of the rotary slide mechanism.

BRIEF DESCRIPTION OF THE DRAWINGS

FIG. 9 is a perspective view showing a floor hinge bracket of the rear seat apparatus according to the second embodiment;

FIG. 11 is an exploded perspective view showing part of a rotary slide mechanism of the rear seat apparatus according to the third embodiment as viewed from the front of the vehicle and at a diagonal;

FIG. 13 is a view illustrating the operation of the rear seat apparatus according to the third embodiment;

DESCRIPTION OF THE PREFERRED EMBODIMENTS

A first embodiment of a rear seat apparatus for a vehicle of the present invention will now be described with reference to FIGS. 1 to 4.

In these drawings, arrow FR indicates the forward direction of the vehicle, and arrow UP indicates the upward direction of the vehicle.

Figure 1:
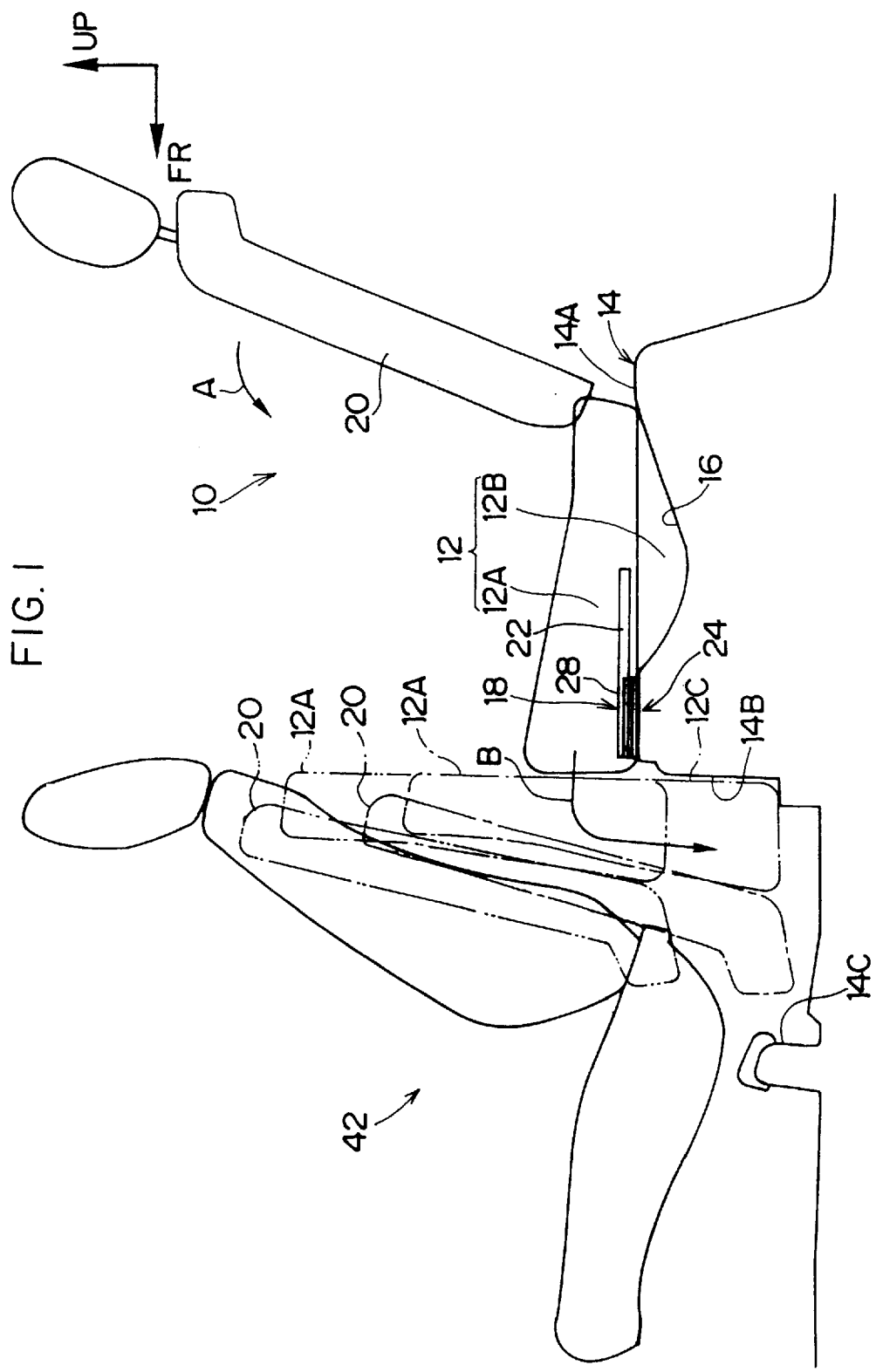
FIG. 1 is a schematic side view showing a rear seat apparatus for a vehicle according to a first embodiment of the present invention.

As shown in FIG. 1, a rear seat cushion 12 of a rear seat 10 of the first embodiment is disposed on an elevated rear floor surface 14A of a floor 14, which has a stepped portion between its front portion and the elevated rear floor surface 14A. The rear seat cushion 12 is divided into a rear seat cushion main body portion 12A located above the floor surface 14A and a rear seat cushion divisional portion 12B located below the floor surface 14A such that these upper and lower divisional portions can be separated from each other.

The rear seat cushion main body portion 12A is mounted on the front end portion of the floor surface 14A via a rotary slide mechanism 18. The rotary slide mechanism 18 allows the rear seat cushion main body portion 12A to swing by approximately 90 degrees toward the front of the vehicle and then to slide downward so that the rear seat cushion is brought into the upright state (illustrated by the dot-and-dash line in FIG. 1). In this case, the rear seat cushion divisional portion 12B remains in a depression 16 formed in the floor surface 14A.

A rear seat back 20 is mounted via an unillustrated hinge portion to the rear portion of the rear seat cushion main body portion 12A such that it can swing forward (in the direction of arrow A in FIG. 1).

Accordingly, when with the rear seat back 20 folded toward the front of the vehicle, the rear seat cushion main body portion 12A is raised upright, the rear seat cushion divisional portion 12B remains in the depression 16 formed in the floor surface 14A, thereby providing a flat surface for carrying an article thereon. In addition, since the rear surface of the rear seat cushion main body portion 12A in its upright state is flat, a relatively large space is provided for housing an article therein.

When the rear seat cushion main body portion 12A is held at the position illustrated by the dot-and-dash line of FIG. 1, there is almost no clearance formed between a vertical wall surface 14B of the floor 14 and a bottom surface 12C of the rear seat cushion main body portion 12A.

Figure 2:
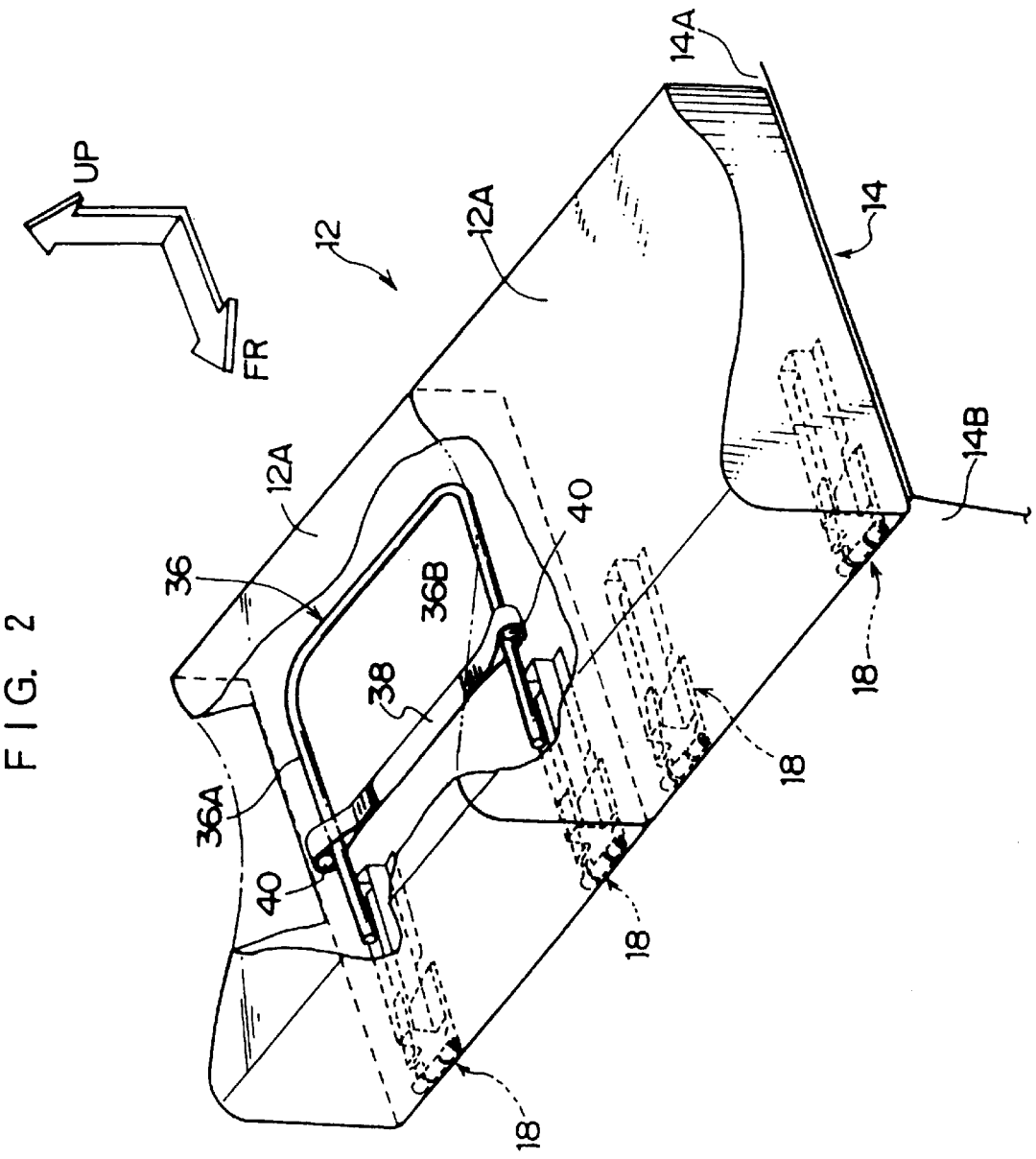
FIG. 2 is a perspective and partially broken view showing a rear seat cushion of the rear seat apparatus according to the first embodiment as viewed from the front of the vehicle and at a diagonal.

As shown in FIG. 2, the rotary slide mechanism 18 extending in the longitudinal direction of the vehicle is disposed at the front portion of the bottom surface of each of the right and left rear seat cushion bodies 12A such that it is located off a normal seating zone, for example, in the vicinity of the right and left ends of each rear seat cushion main body portion 12A.

Figure 3:
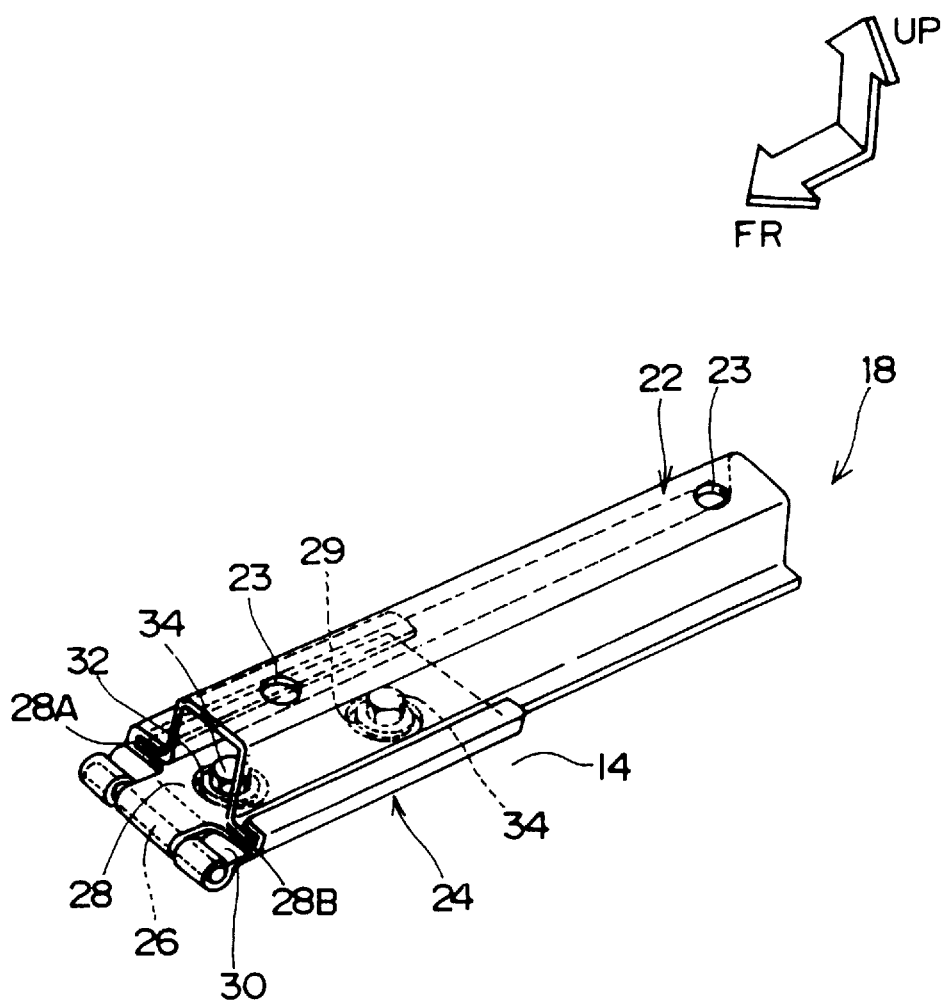
FIG. 3 is a perspective view showing a rotary slide mechanism of the rear seat apparatus according to the first embodiment as viewed from the front of the vehicle and at a diagonal.

As shown in FIG. 3, the rotary slide mechanism 18 is composed of a rail 22, which is mounted to the bottom portion of the rear seat cushion main body portion 12A, and a hinge portion 24, which is mounted onto the floor 14.

The rail 22 has a pair of front and rear mounting holes 23 formed therein. The rail 22 extending in the longitudinal direction of the vehicle is fixed to the bottom portion of the rear seat cushion main body portion 12A using unillustrated bolts inserted into the mounting holes 23. The hinge portion 24 is composed of a pin 26 as connection means, an upper plate 28, and a lower plate 30. The axis of the pin 26 is located in the same surface as the floor surface 14A and extends in the widthwise direction of the vehicle. The rail 22 is slidably engaged with the upper plate 28. The front end portion of the upper plate 28 and that of the lower plate 30 are rotatably connected together by means of the pin 26, thereby allowing the upper plate 28 to swing about the pin 26 with respect to the lower plate 30.

The lower plate 30 is fixed onto the floor 14 using bolts 34, which are received in corresponding through-holes 32 formed in the upper plate 28.

Accordingly, the hinge portion 24 allows the rear seat cushion main body portion 12A to swing from the position illustrated by the solid line in FIG. 1 to the position illustrated by the two dots-and-dash line. When the rear seat cushion main body portion 12A is raised up by approximately 90 degrees, the rail 22 fixed to the rear seat cushion main body portion 12A can slide along a pair of right and left channels 28A and 28B (FIG. 3) provided on the upper plate 28. Thus, the rear seat cushion main body portion 12A can slide down in the direction of arrow B in FIG. 1 to the position illustrated by the dot-and-dash line.

Figure 4:
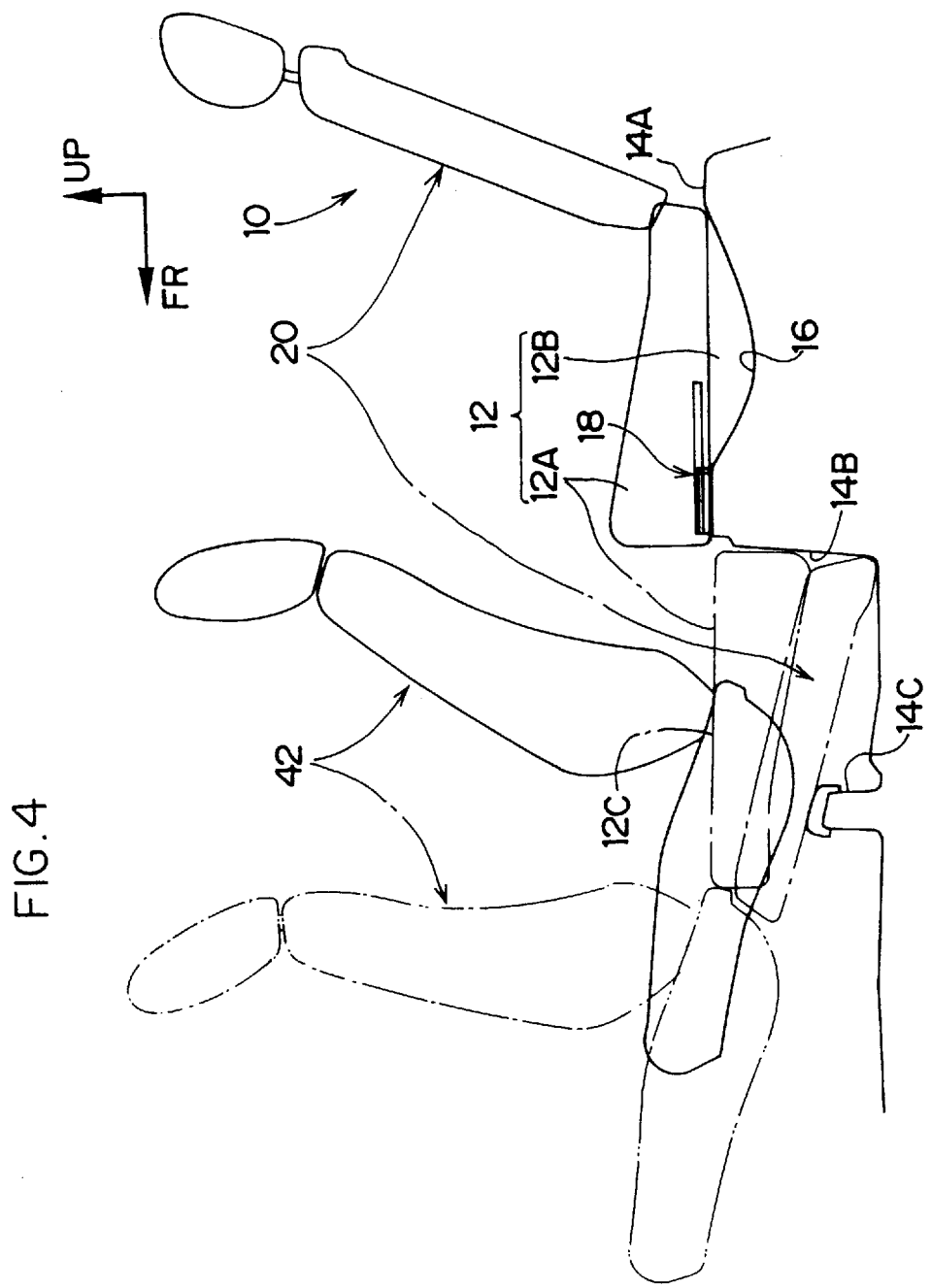
FIG. 4 is a schematic side view illustrating the operation of the rear seat apparatus according to the first embodiment.

In the first embodiment, as shown in FIG. 4, a front seat 42 is moved toward the front of the vehicle from the position illustrated by the solid line to the position illustrated by the dot-and-dash line. The rear seat cushion main body portion 12A and the rear seat back 20 in the normal seating state are folded together by folding the rear seat back 20 onto the rear seat cushion main body portion 12A, and the folded rear seat cushion main body portion 12A and the rear seat back 20 are swung by approximately 180 degrees toward the front of the vehicle, thereby entering the overturned state illustrated by the dot-and-dash line. The rotary slide mechanism 18 allows the above-described movement.

In the overturned state, the rear seat back 20 is supported from underneath by a projecting portion 14C formed on the floor 14.

In the first embodiment, as shown in FIG. 2, a frame 36 formed by bending a pipe into a U-like shape is provided along the bottom peripheral portion of the rear seat cushion main body portion 12A. The frame 36 is raised together with the rear seat cushion main body portion 12A. Further, a webbing 38 is provided between leg portions 36A and 36B of the frame 36 such that it extends in the widthwise direction of the vehicle. Thus, when the rear seat cushion main body portion 12A is in its upright state and an article carried behind the rear seat cushion main body portion 12A moves toward the front of the vehicle, the webbing 38 receives the article to transmit a load of the article to the frame 36.

Further, an elastic pad 40 is inserted between the webbing 38 and each of the legs 36A and 36B of the frame 36, thereby tensing the webbing 38 by its elastic force in the normal state. When a passenger 15 sits in the rear seat cushion main body portion 12A which is in its seating state, the weight of the passenger 15 causes the pads 40 to deform via the webbing 38, so that the webbing 38 can deflect. Thus, the cushioning effect of the rear seat cushion 12 is not hindered. When the weight of the passenger 15 is not imposed on the rear seat cushion main body portion 12A (i.e. in the normal free state), the pads 40 are restored to make flat the bottom surface of the rear seat cushion main body portion 12A.

Next, the operation of the first embodiment will be described.

In the rear seat apparatus of the first embodiment, the rotary slide mechanism 18 attached to the bottom surface of the rear seat cushion main body portion 12A allows the rear seat cushion main body portion 12A with the rear seat back 20 folded thereonto to swing by approximately 90 degrees toward the front of the vehicle so as to enter the upright state and then allows them to slide downward from the position illustrated by the two dots-and-dash line in FIG. 1 to the position of the upright state (illustrated by the dot-and-dash line in FIG. 1). Thus, the rear seat cushion main body portion 12A and the rear seat back 20 are held at the relatively low position, thereby facilitating loading/unloading an article from the front seat side.

Since the rear seat cushion main body portion 12A is held upright without leaving almost no clearance between the rear seat cushion main body portion 12A and the vertical wall surface 14B of the floor 14, it is possible to prevent an article from dropping in the clearance which would be otherwise formed.

Since the rotary slide mechanism 18 allows the rear seat cushion main body portion 12A and the rear seat back 20 to be overturned as illustrated by the dot-and-dash line in FIG. 4, a relatively large luggage space is provided which has a flat floor extending continuously from the bottom surface 12C of the rear seat cushion main body portion 12A toward the rear portion of the floor surface 14A.

Thus, the rear seat apparatus for a vehicle according to the first embodiment allows diversified seat layouts in accordance with the state of seating of passengers as well as the number of passengers.

Figure 5:
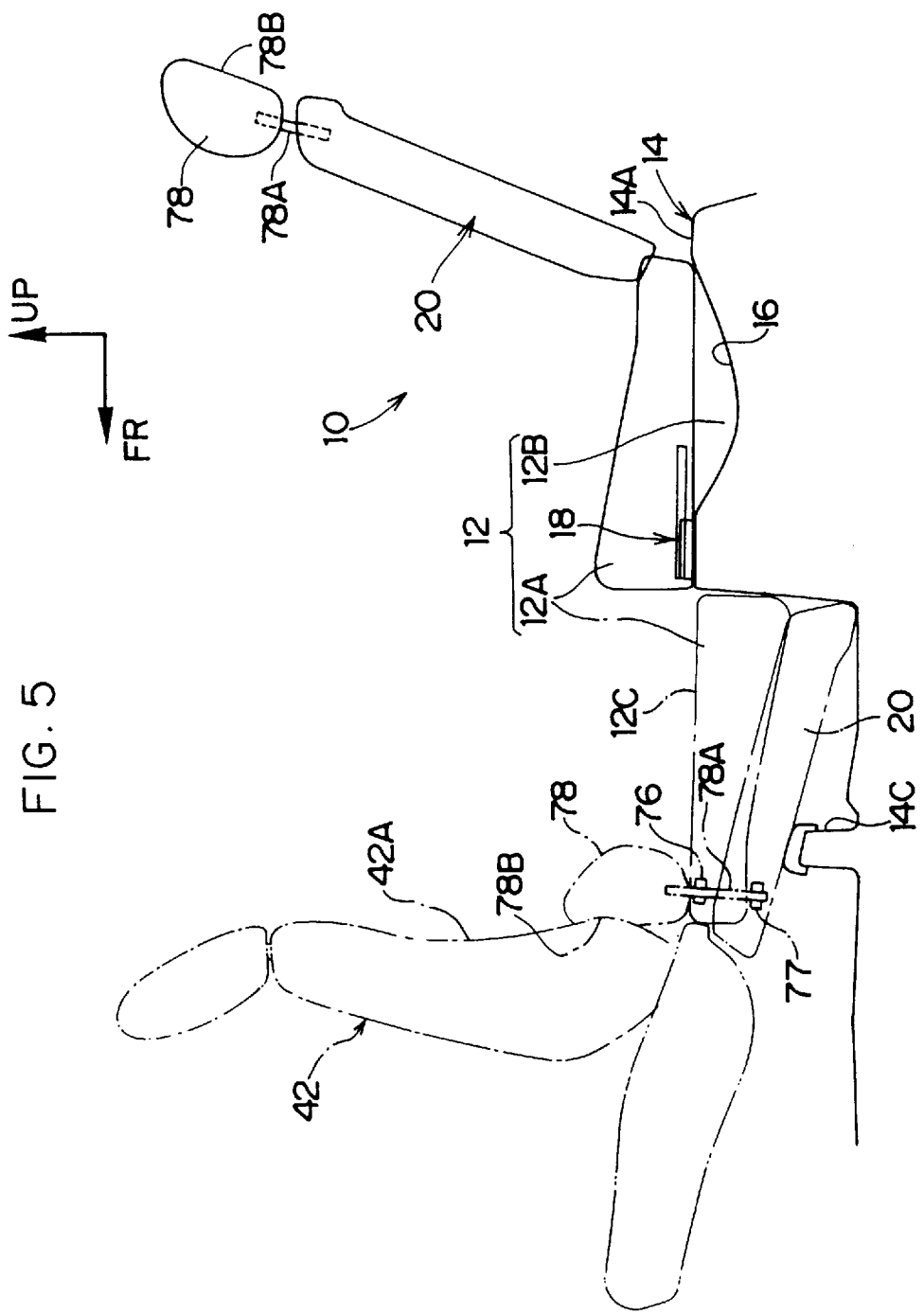
FIG. 5 is a schematic side view showing a rear seat apparatus for a vehicle according to a modification of the first embodiment of the present invention.

As shown in FIG. 5, guide portions 76 and 77 for insertion of a headrest stay may be provided on the rear seat cushion main body portion 12A and the rear seat back 20, respectively, such that the guide portions 76 and 77 are positioned in the vicinity of the lower end portion of a front seat back 42A of the front seat 42 when the rear seat cushion main body portion 12A and the rear seat back 20 are in the overturned state. Stays 78A of a headrest 78 are inserted into the guide portions 76 and 77.

In this case, when an article moves forward due to the vehicle receiving an impact from its front end, the headrest 78 serves as a stopper against the article. Also, the headrest 78 can be held behind the front seat 42. By inserting the stays 78A of the headrest 78 into the guide portions 76 and 77, the rear seat cushion main body portion 12A and the rear seat back 20 can be locked together in a simple manner.

By making a rear surface 78B of the headrest 78, which does not contact a passenger's head, correspond in profile to the rear surface of the front seat back 42A of the front seat 42, the headrest 78 contacts closely the front seat back 42A. This allows the headrest 78 to be disposed more frontward, thereby providing a larger luggage room.

If a force applied to the headrest 78 is received only by the guide portions 76, a bending moment and a reaction force will act on the guide portions 76 due to a cantilever supporting structure. Since the force is received by both guide portions 76 and 77, each guide portions 76 functions as a fulcrum, and only a reaction force acts on each guide portions 77 with a bending moment being canceled. Accordingly, the guide portions 76 and 77 require less reinforcement.

A second embodiment of a rear seat apparatus for a vehicle of the present invention will now be described with reference to FIGS. 6 to 9.

The members identical to those of the first embodiment are denoted by the same reference numerals, and their description will be omitted.

Figure 6:
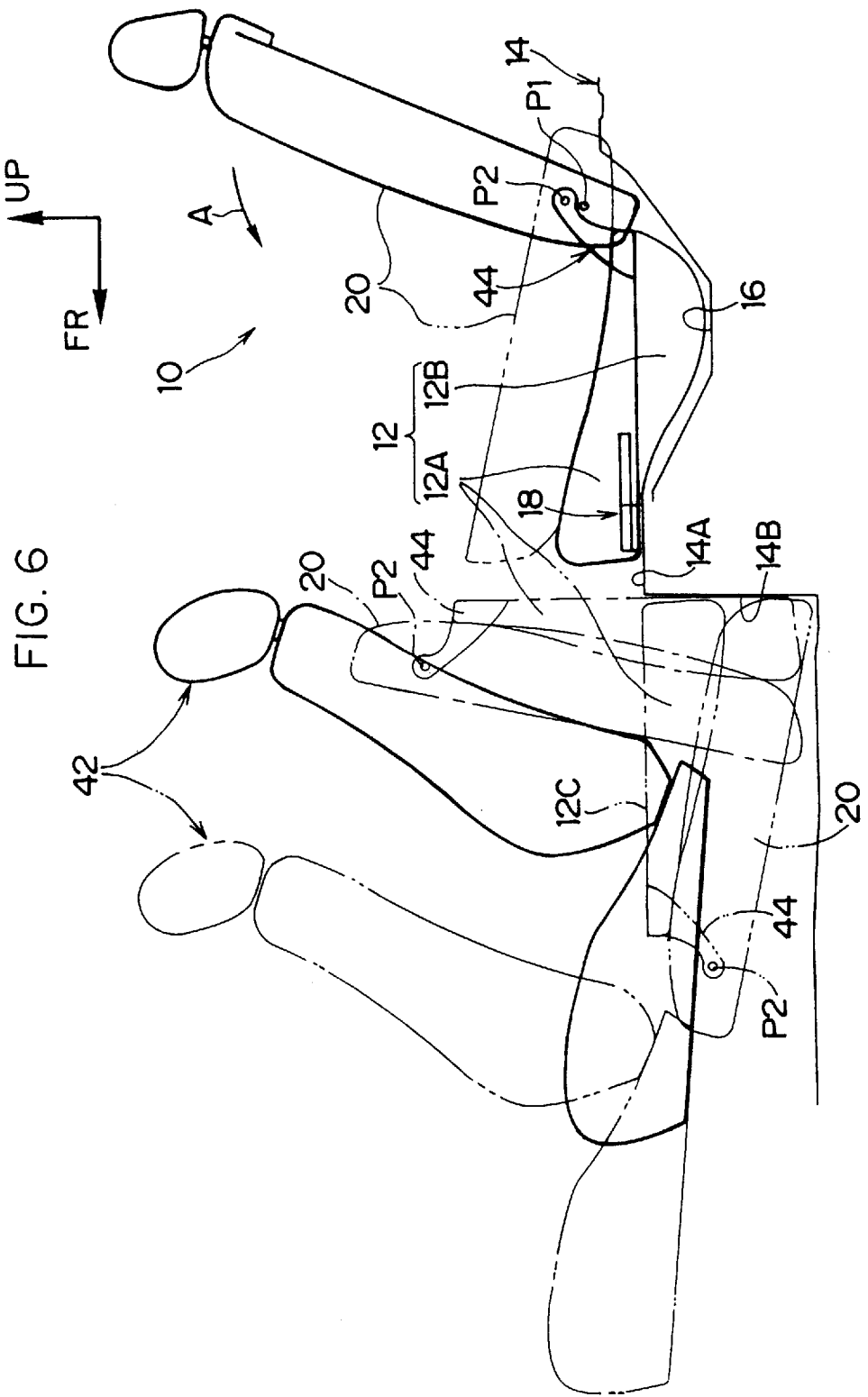
FIG. 6 is a schematic side view showing a rear seat apparatus for a vehicle according to a second embodiment of the present invention.

As shown in FIG. 6, in the rear seat apparatus according to the second embodiment, in the normal seating state, the rear seat back 20 has its center P1 of rotation provided at a bracket (not shown) fixed on the floor 14, so that the rear seat back 20 swings towards the front of the vehicle (in the direction of arrow A in FIG. 6) to move to the position illustrated by the three dots-and-dash line in FIG. 6. When the rear seat cushion main body portion 12A, together with the rear seat back 20, is raised up, the rear seat cushion main body portion 12A and the rear seat back 20 are swung together while the rear seat back 20 is supported by center P2 of rotation provided at a hinge bracket 44 fixed on the rear seat cushion main body portion 12A. After being swung by approximately 90 degrees toward the front of the vehicle, the rear seat cushion main body portion 12A and the rear seat back 20 slide downward so that their front portions are held on the front lower-level portion of the floor of the vehicle, thus entering the upright state (illustrated by the dot-and-dash line in FIG. 6). Alternatively, the rear seat cushion main body portion 12A and the rear seat back 20 are swung by approximately 180 degrees to enter the overturned state (illustrated by the two dots-and-dash line in FIG. 6).

Figure 7:
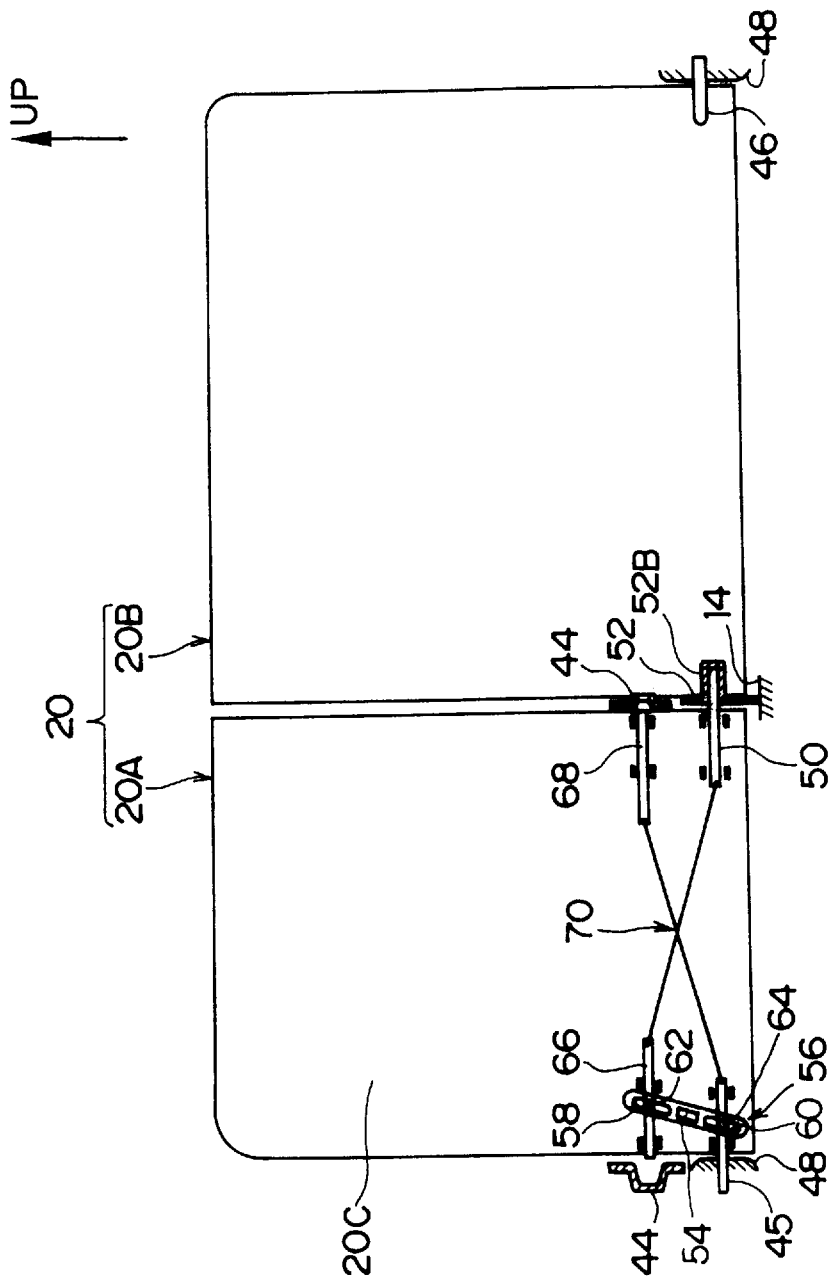
FIG. 7 is a schematic rear view showing a rear seat back of the rear seat apparatus according to the second embodiment.

As shown in FIG. 7, the rear seat back 20 is divided into a left rear seat back 20A which is located behind a front passenger's seat, and a right rear seat back 20B, which is located behind a driver's seat. This prevents interference with an unillustrated tunnel portion of the floor when the rear seat cushion main body 12A of a left rear seat cushion located is swung by approximately 180 degrees toward the front of the vehicle.

Lower pins 45 and 46 are provided in the left rear seat back 20A and in the right rear seat back 20B, respectively, and are located at the outer sides of the rear seat backs 20A and 20B, respectively, in the widthwise direction of the vehicle. In the normal seating state, the lower pins 45 and 46 are inserted into respective bearing portions provided on a body 48. A lower pin 50 is provided in the left rear seat back 20A and is located at the inner side of the rear seat back 20A in the widthwise direction of the vehicle. The lower pin 50 is inserted into a bearing portion 52B of a floor hinge bracket 52 fixed to the floor 14.

As shown in FIG. 9, the floor hinge bracket 52 is fixed to the floor 14 using bolts 53. The bearing portion 52B is a tubular member projecting from the floor hinge bracket 52.

As shown in FIG. 7, the bearing portion 52B is inserted into the inner side (in the widthwise direction of the vehicle) of the right rear seat back 20B, thereby serving as the axis of rotation of the rear seat back 20B. A knob 54 serving as changeover means is provided on a rear surface 20C of the left rear seat back 20A. A guide 56 formed integrally with the knob 54 has upper and lower elongated holes 58 and 60, and a protrusion 64 provided on the lower pin 45 and a protrusion provided on the upper pin 66 are engaged with the elongated holes 58 and 60 of the guide 56, respectively.

Figure 8:
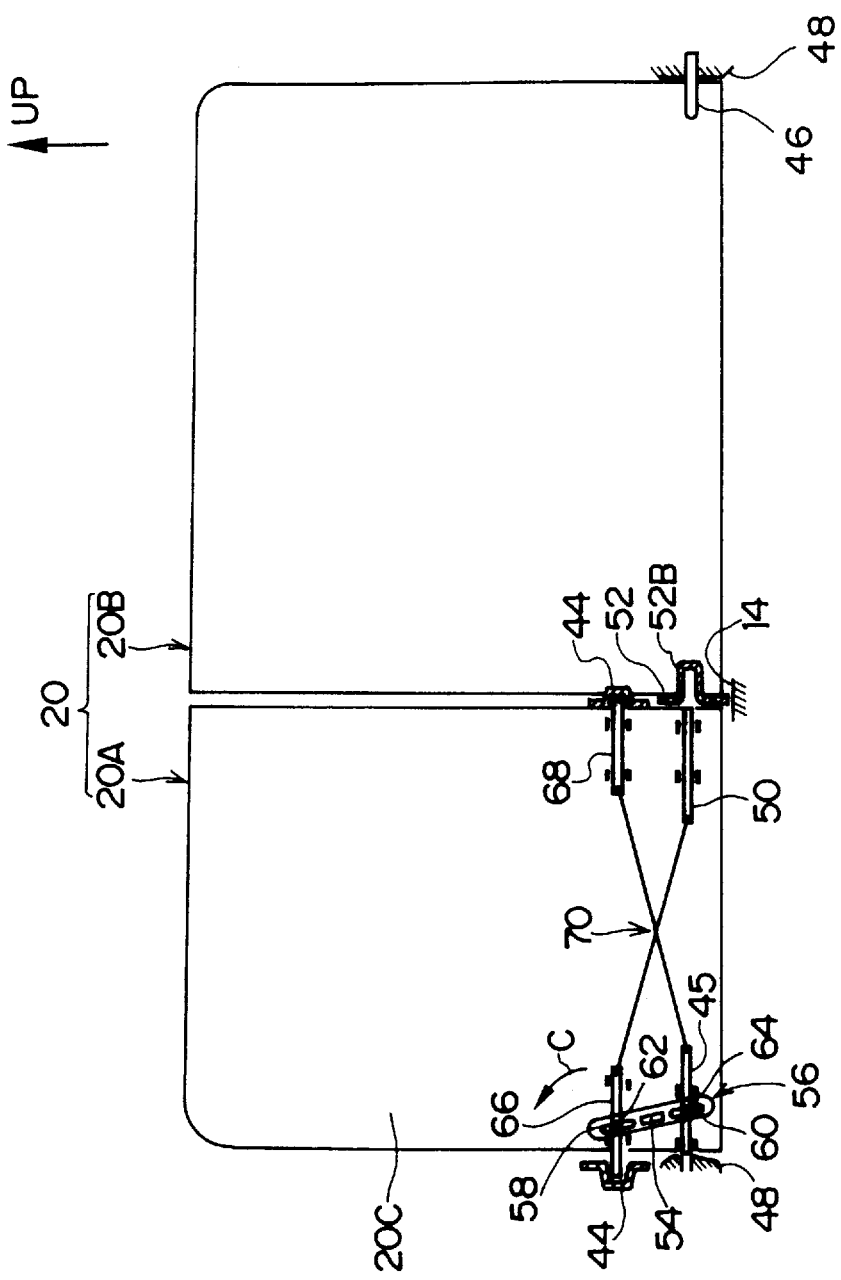
FIG. 8 is a schematic rear view illustrating the operation of the rear seat apparatus according to the second embodiment.

As shown in FIG. 8, when the rear seat cushion main body portion 12A is raised up, the knob 54 is turned counterclockwise (in the direction of arrow C), so that the lower pin 45 is disengaged from the body 48 while the upper pin 66 is inserted into the seat hinge bracket 44.

The lower pin 50, which is disposed at the inner side (in the widthwise direction of the vehicle) of the left rear seat back 20A, is connected to the upper pin 66 through a link 70 or the like, while an upper pin 68 is connected to the lower pin 45 through the link 70. Accordingly, linking o the movement of the upper and lower pins 66 and 45, the lower pin 50 disengages from the bearing portion 52B, and the upper pin 68 is inserted into the seat hinge bracket 44. As a result of this linked operation, the center of rotation of the rear seat back 20 changes from P1 to P2 in FIG. 6.

Next, the operation of the second embodiment will be described.

In the rear seat apparatus of the second embodiment, in the normal seating state, the rear seat beck 20 has its center P1 of rotation at the bracket (not shown) fixed on the floor 14. In this case, the rear seat back 20 can be swung toward the front of the vehicle (in the direction of arrow A in FIG. 6) to be folded onto the rear seat cushion main body portion 12A (as illustrated by the three dots-and-dash line in FIG. 6). Also, the seat layout can be modified as follows. While the rear seat back 20 is held in its seat state, only the rear seat cushion main body portion 12A on the right side can be swung by approximately 90 degrees and further be slid downward so that the rear seat cushion is brought into the upright state. Alternatively, only the rear seat cushion main body portion 12A on the left side can also be brought into the upright state or can be swung by approximately 180 degrees into the overturned state.

When P2 is chosen as the center of rotation for the rear seat back 20, the rear seat back 20A, together with the rear seat cushion main body 12A, can be swung by approximately 180 degrees toward the front of the vehicle, thereby entering the overturned state (illustrated by the two dots-and-dash line in FIG. 6). This provides a relatively large space for housing an article which has a flat floor extending continuously from the bottom surface 12C of the rear seat cushion main body portion 12A toward the rear portion of the floor surface 14A.

A third embodiment of a rear seat apparatus for a vehicle of the present invention will now be described with reference to FIGS. 10 to 13.

The members identical to those of the first embodiment are denoted by the same reference numerals, and their description will be omitted.

Figure 10:
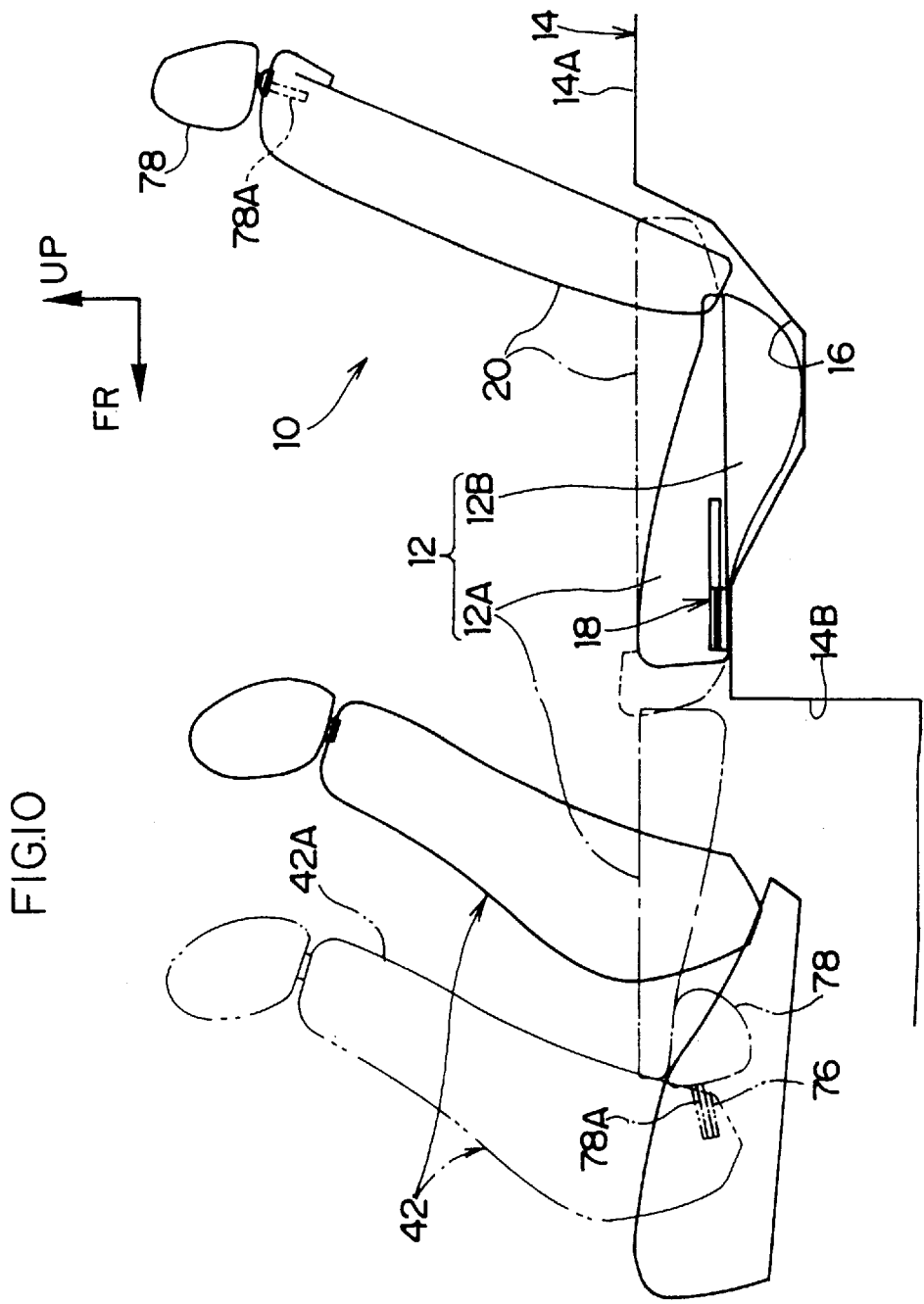
FIG. 10 is a schematic side view showing a rear seat apparatus for a vehicle according to a third embodiment of the present invention.

As shown in FIG. 10, in the rear seat apparatus according to the third embodiment, when the rear seat cushion main body portion 12A is swung by approximately 180 degrees toward the front of the vehicle to enter the overturned state (illustrated by the dot-and-dash line), the overturned rear seat cushion main body portion 12A becomes substantially flush with the rear seat back 20 folded toward the front of the vehicle as illustrated by the dot-and-dash line.

Also, in the rear seat apparatus according to the third embodiment, the front seat 42 can be moved toward the front of the vehicle from a position illustrated by the solid line to a position illustrated by the dot-and-dash line, and the stays 78A of the headrest 78 can be inserted into the head rest stay guide portions 76 provided at the lower portion of the front seat back 42A. The head rest 78 fixed into the guide portions 76, as illustrated by the dot-and-dash line in FIG. 10, supports the front end portion of the overturned rear seat cushion main body portion 12A. The guide portions 76 may be provided at the seat cushion of the front seat 42.

As shown in FIG. 11, in the rotary slide mechanism 18 of the third embodiment, a protrusion 80 is provided at the rear portion of each of the channel portions 28A and 28B of the upper plate 28 such that the protrusions 80 face each other so as to decrease the distance between the channel portions 28A and 28B at the position of the protrusions 80. A pin 82 is provided at the front end portion of the rail 22 such that it passes through the front end portion in the widthwise direction of the vehicle. The pin 82 has a length greather than the distance between the facing protrusions 80 and serves as second connection means. Flange portions 22A and 22B of the rail 22 are partially cut away at the position corresponding to the pin 82.

Figure 12A:
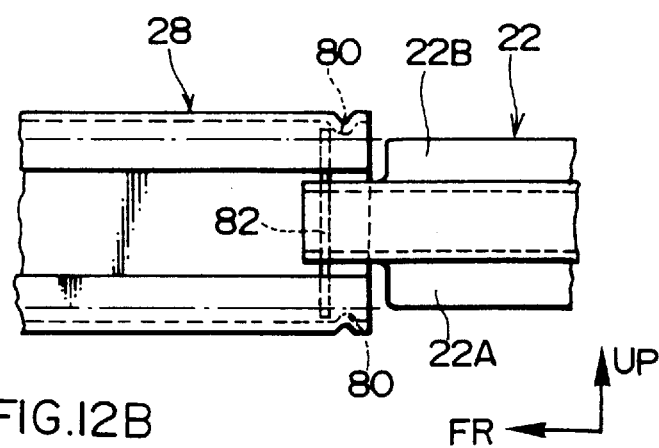
FIG. 12A is a plan view showing part of the rotary slide mechanism of the rear seat apparatus according to the third embodiment.
Figure 12B:
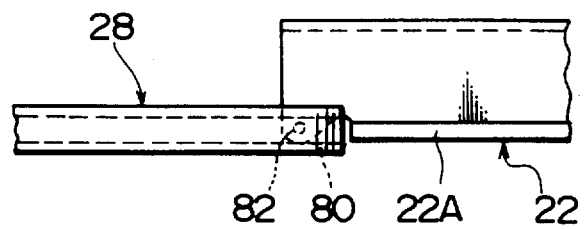
FIG. 12B is a side view showing part of the rotary slide mechanism of the rear seat apparatus according to the third embodiment.

As shown in FIGS. 12A and 12B, when the rail 22 is slid to the rear end of the upper plate 28, the flange portions 22A and 22B of the rail 22 come off the upper plate 28 while only the pin 82 remain within the upper plate 28. In this state, the rail 22 is pivotable with respect to the upper plate 28.

Next, the operation of the third embodiment will be described.

In the rear seat apparatus of the third embodiment, as shown in FIG. 13, the rear seat cushion main body portion 12A is swung by approximately 90 degrees from the position of the normal seating state (illustrated by the two dots-and-dash line in FIG. 13) to a position illustrated by the dot-and-dash line in FIG. 13. Subsequently, the rear seat cushion main body portion 12A is lifted toward the upper portion of the vehicle to a position illustrated by the solid line in FIG. 13 so as to slide the rail 22 up to the rear end of the upper plate 28. From this lifted position, the seat cushion main body portion 12A is swung by approximately another 90 degrees toward the front of the vehicle to the position illustrated by the three dots-and-dash line in FIG. 13 (overturned state). This provides a relatively large luggage space having a flat floor which extends continuously from the bottom surface 12C of the rear seat cushion main body portion 12A to the rear portion of the floor surface 14A via the rear surface 20C of the forwardly folded rear seat back 20 (positioned as illustrated by the dot-and-dash line in FIG. 13).

Since the rear headrest 78 fixed into the guide portions 76 (as illustrated by the dot-and-dash line in FIG. 10) supports the front end portion of the overturned rear seat cushion main body portion 12A, there is no need for providing means for supporting the overturned rear seat cushion main body portion 12A.

A fourth embodiment of a rear seat apparatus for a vehicle of the present invention will now be described with reference to FIGS. 14 to 18.

The members identical to those of the first embodiment are denoted by the same reference numerals, and their description will be omitted.

Figure 14:
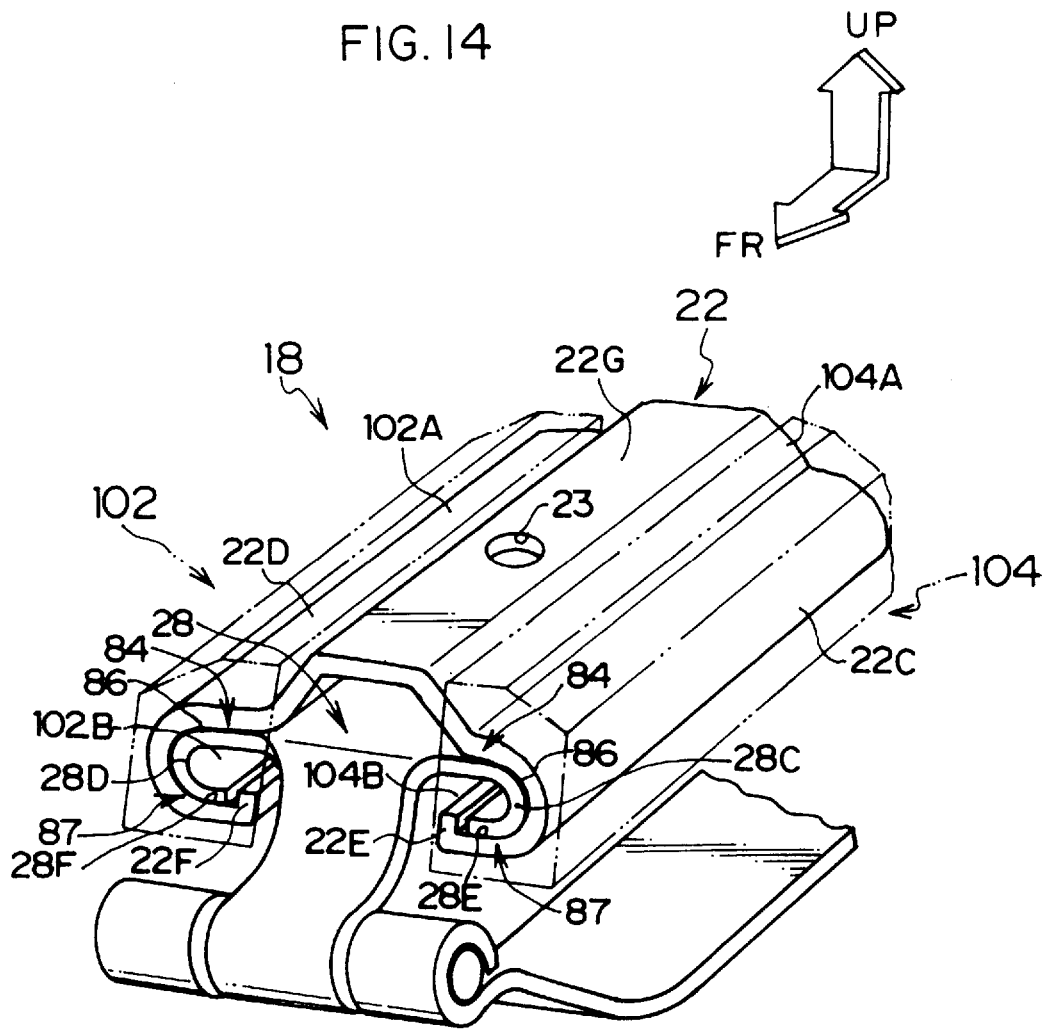
FIG. 14 is a perspective view showing a rotary slide mechanism of a rear seat apparatus for a vehicle according to a fourth embodiment of the present invention as viewed from the front of the vehicle and at a diagonal.
Figure 18:
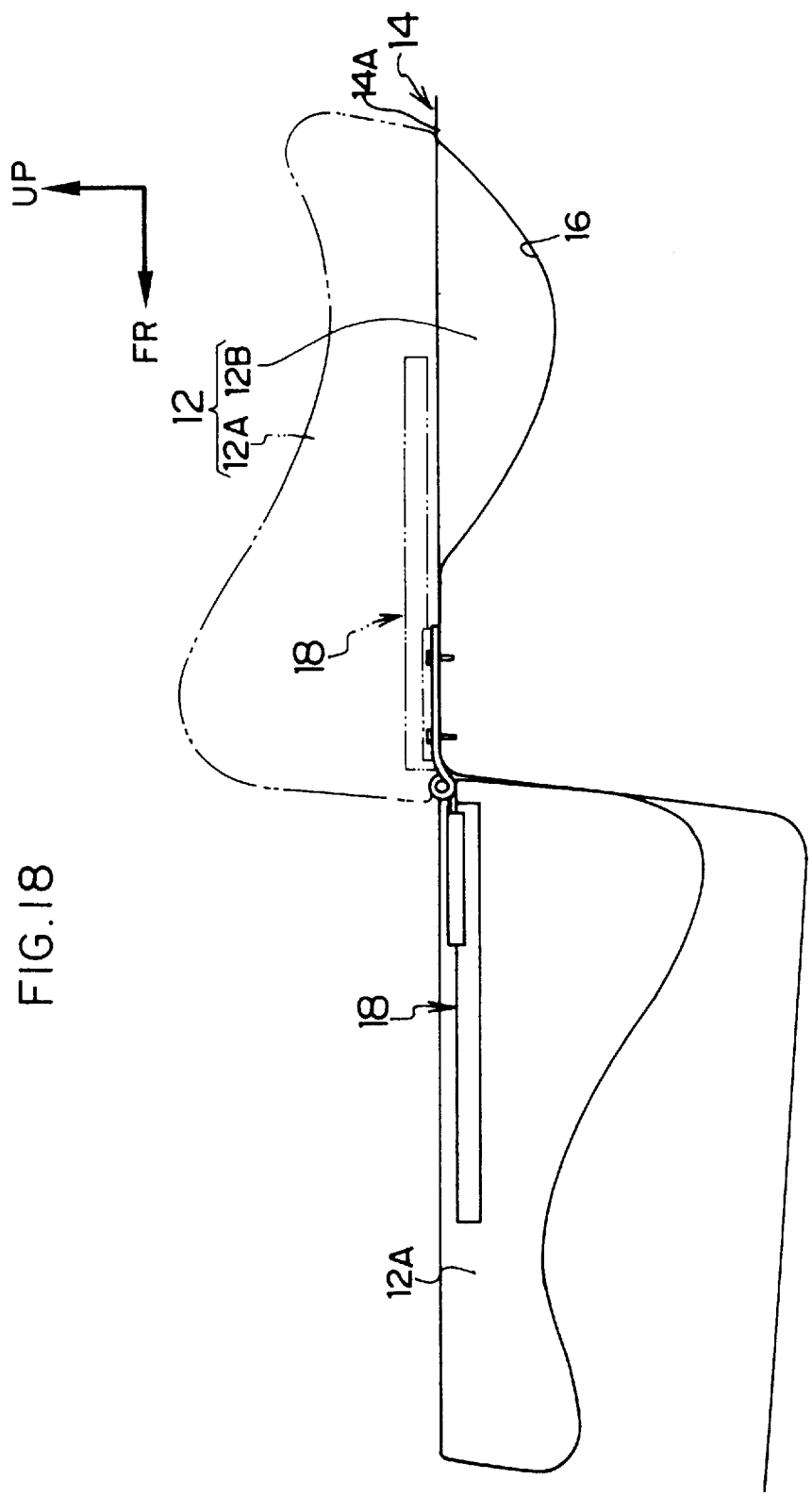
FIG. 18 is a schematic side view illustrating the operation of the rear seat apparatus according to the fourth embodiment.

As shown in FIG. 14, in the rotary slide mechanism 18 of the fourth embodiment, each of the rail 22 and the upper plate 28 has a substantially U-shaped cross section as viewed in the longitudinal direction thereof such that the opening of the U-shape faces downward in the normal seating state (the rear seat cushion main body portion 12A is not swung, as illustrated by the two dots-and-dash line in FIG. 18).

Figure 15:
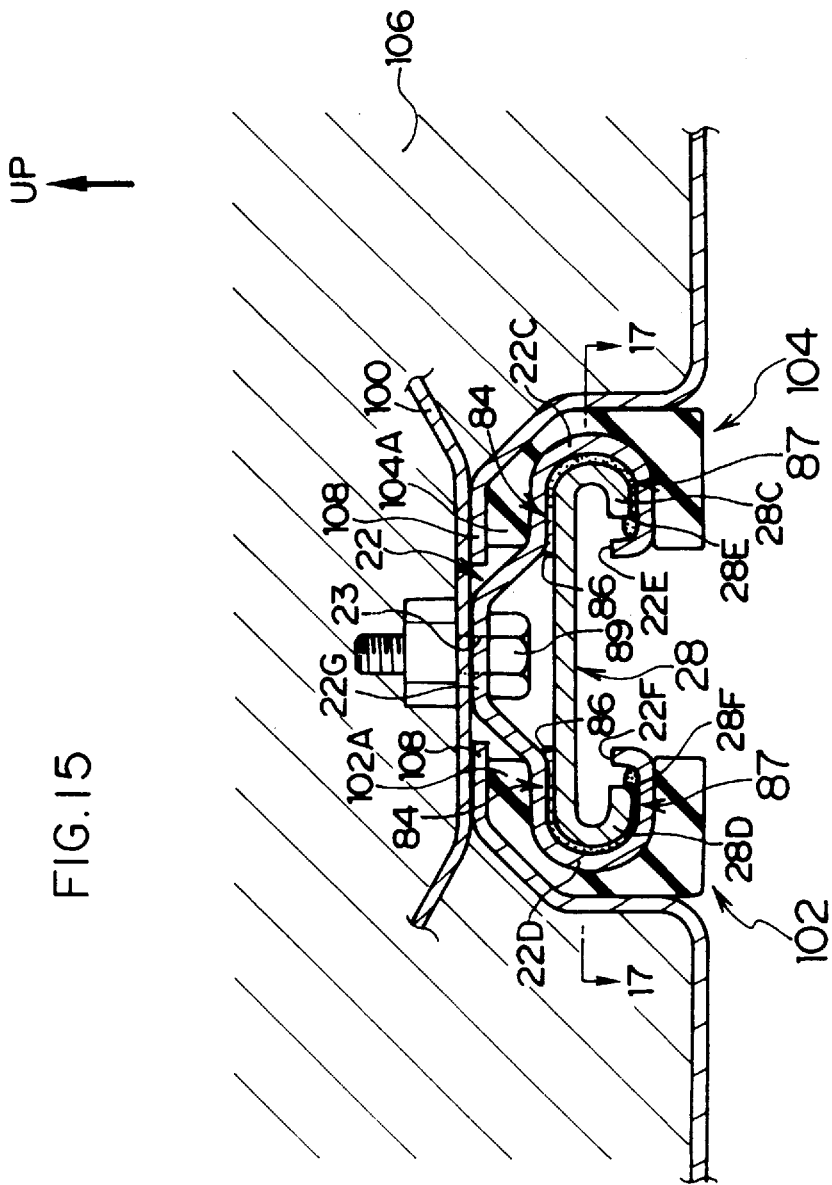
FIG. 15 is a cross-sectional view showing the rotary slide mechanism of the rear seat apparatus according to the fourth embodiment as viewed from the front of the vehicle.

As shown in FIG. 15, both side portions of the rail 22 in the widthwise direction of the rail 22 project outward to form guide portions 22C and 22D. These guide portions 22C and 22D house slidably sliding portions 28C and 28D of the upper plate 28, which sliding portions 28C and 28D project outward in a manner similar to that of the guide portions 22C and 22D.

Both end portions of the rail 22, which define the opening of the U-shape, are further bent upward to form bend portions 22E and 22F. These bend portions 22E and 22F project upward beyond the corresponding bottom end portions 28E and 28F of the sliding portions 28C and 28D of the upper plate 28. Grease 86 is applied to a sliding surface 84 between the rail 22 and the upper plate 28. The sliding surface 84 is a sliding surface which becomes effective in the normal seating state (the rear seat cushion main body portion 12A is not swung).

Figure 16:
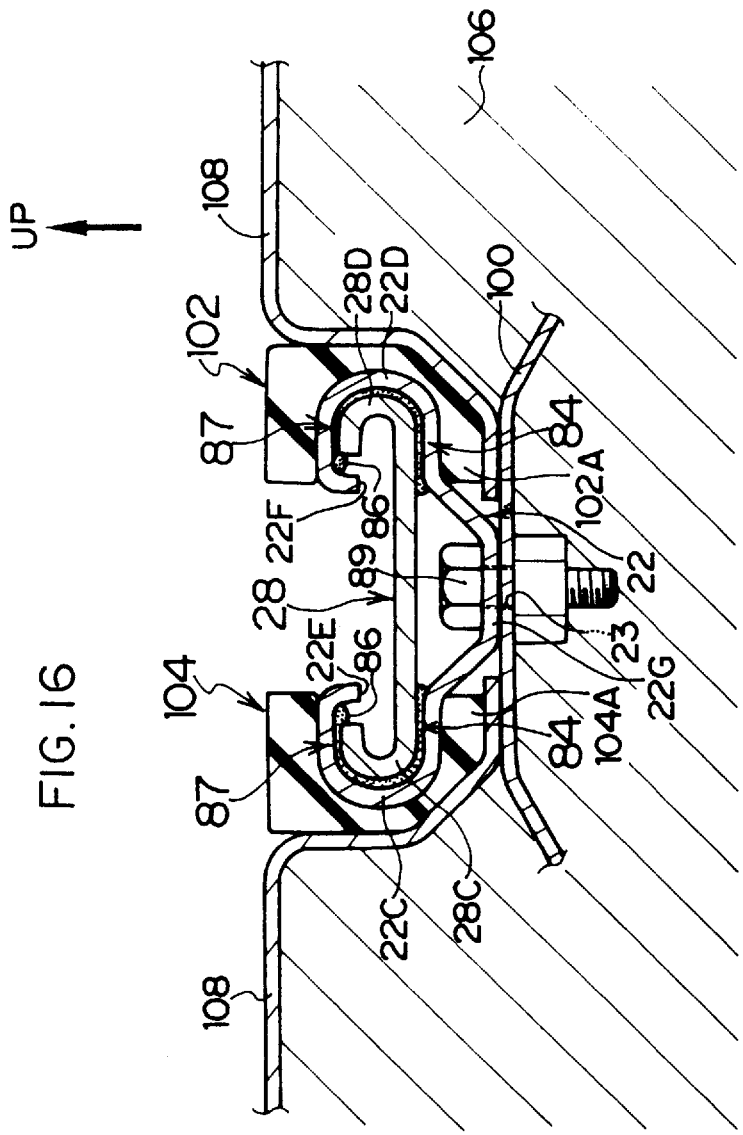
FIG. 16 is a cross-sectional view showing the rotary slide mechanism of the rear seat apparatus according to the fourth embodiment as viewed from the rear of the vehicle in a state in which the rear seat cushion is turned by 180 degrees.

As shown in FIG. 16, the grease 86 is also applied to a sliding surface 87 between the rail 22 and the upper plate 28. The sliding surface 87 is a sliding surface which becomes effective in the overturned state after being swung by approximately 180 degrees (the rear seat cushion main body portion 12A is swung by approximately 180 degrees as illustrated by the solid line in FIG. 18).

As shown in FIG. 15, a mounting portion 22G projecting upward and having a trapezoidal cross-section is formed on the rail 22 at the position opposite to the opening of the rail 22. The rail 22 is fixed to the seat frame 100 using bolts 89 which are inserted as fixing means through mounting holes 23 formed in the mounting portion 22G.

Protectors 102 and 104 are temporarily attached to the outer surfaces of both side portions of the rail 22 in the widthwise direction of the rail 22 so as to cover the guide portions 22D and 22C, respectively. Upper portions 102A and 104A of the protectors 102 and 104, respectively, together with seat facing 108, are held between the guide portions 22C and 22D of the rail 22 and the seat frame 100. The seat facing 108 covers the surface of a cushion pad 106, which is foamed and integrated with the seat frame 100.

Figure 17:
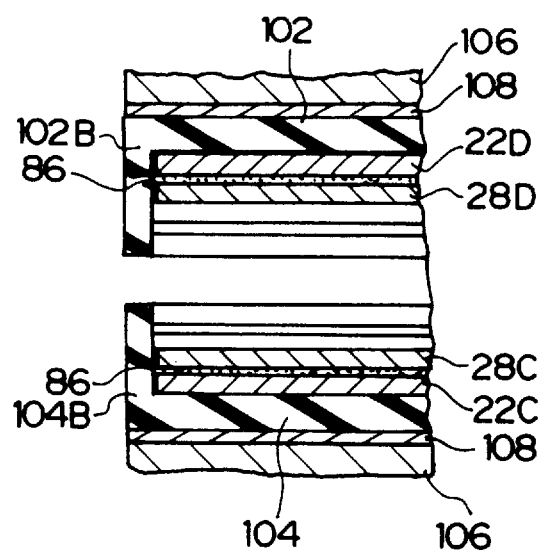
FIG. 17 is a cross-sectional view taken along line 17—17 of FIG. 15.

As shown in FIG. 17, front walls 102B and 104B are formed at the front end portions of the protectors 102 and 104, respectively. The front walls 102B and 104B of the protectors 102 and 104 restrict a longitudinal movement of the front end portions of the guide portions 22C and 22D of the rail 22.

Next, the operation of the fourth embodiment will be described.

In the rear seat apparatus of the fourth embodiment, the grease 86 is applied to the sliding surface 84 between the rail 22 and the upper plate 28 which becomes effective in the normal seating state (the rear seat cushion main body portion 12A is not swung) and to the sliding surface 87 between the rail 22 and the upper plate 28 which becomes effective in the overturned state (the rear seat cushion main body portion 12A is swung by approximately 180 degrees). The grease 86 is applied along the inner surfaces of the guide portions 22C and 22D of the rail 22. Further, the bend portions 22E and 22F formed at both end portions of the rail 22 project upward beyond the corresponding bottom end portions 28E and 28F of the sliding portions 28C and 28D of the upper plate 28. As a result, the grease 86 is less likely to leak out from the rail 22. In addition, the front end portions of the guide portions 22C and 22D of the rail 22 are closed by the front walls 102B and 104B of the protectors 102 and 104, thereby preventing the grease 86 from leaking out from the front end portions of the rail 22.

In the rear seat apparatus of the fourth embodiment, the upper portions 102A and 104A of the protectors 102 and 104, together with the seat facing 108 which covers the surface of the cushion pad 106 foamed and integrated with the seat frame 100, are held between the guide portions 22C and 22D of the rail 22 and the seat frame 100. Thus, the protectors 102 and 104 can be reliably fixed onto the rail 22, and the seat facing 108 can also be reliably fixed in place. Further, the protectors 102 and 104 protect the rail 22.

A fifth embodiment of a rear seat apparatus for a vehicle of the present invention will now be described with reference to FIGS. 19 to 23.

In FIGS. 19 to 23, arrow FR denotes the direction toward the front of the vehicle, arrow IN denotes the direction toward the center of the width of the vehicle, and arrow UP denotes the direction toward the top of the vehicle.

Figure 23:
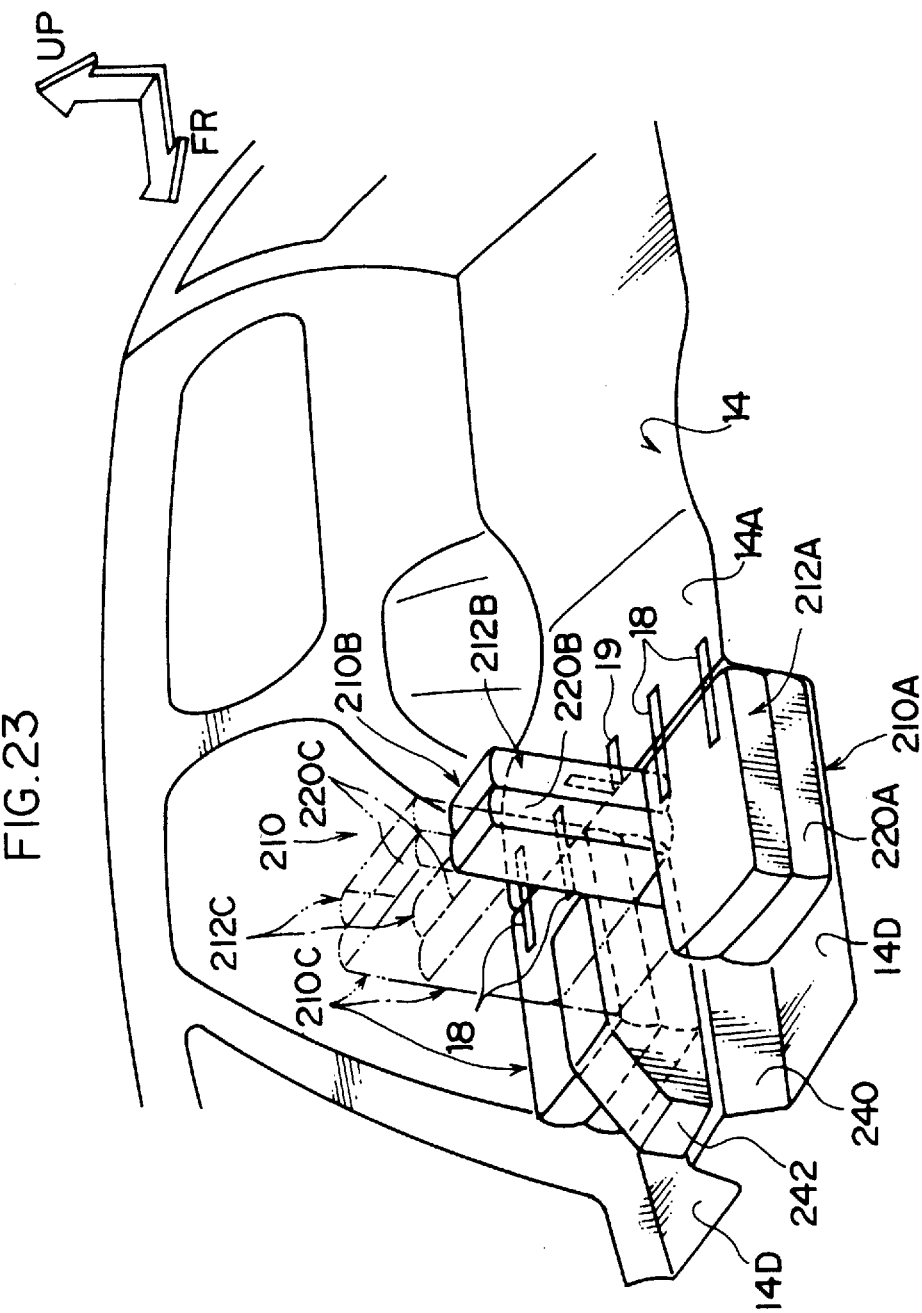
FIG. 23 is a perspective view showing the interior of a vehicle containing the rear seat apparatus according to the fifth embodiment as viewed from the front of the vehicle and at a diagonal.

As shown in FIG. 23, a rear seat 210 of the fifth embodiment is divided in the widthwise direction of the vehicle at the ratio of approximately 4:2:4 into a left rear seat 210A, a center rear seat 210B, and a right rear seat 210C. In the normal state of use (not shown), corresponding rear seat cushions 212A, 212B, and 212C of the rear seats 210A, 210B, and 210C are disposed on the floor surface 14A of the elevated rear portion of the stepped floor 14.

The right rear seat cushion 212C of the right rear seat 210C is mounted on the front end portion of the floor surface 14A via the rotary slide mechanism 18. The rotary slide mechanism 18 allows the right rear seat cushion 212C to swing by approximately 90 degrees toward the front of the vehicle (as illustrated by the two dots-and-dash line in FIG. 23) and then to slide downward such that the front portion of the right rear seat cushion 212C is held on the floor surface 14D of the front lower-level portion of the floor, thus entering the upright state (as illustrated by the dot-and-dash line in FIG. 23). The rotary slide mechanism 18 also allows the right rear seat cushion 212C to swing by approximately 180 degrees toward the front of the vehicle, thus entering the overturned state (as illustrated by the solid line in FIG. 23).

The left rear seat cushion 212A of the left rear seat 210A is also mounted on the front end portion of the floor surface 14A via the rotary slide mechanism 18. The rotary slide mechanism 18 allows the left rear seat cushion 212A to be brought into the upright state or the overturned state.

Each of the rear seat backs 220A, 220B, and 22C is mounted via an unillustrated hinge portion to the rear portion of each of the rear seat cushions 212A, 212B, and 212C such that it can swing forward.

Figure 21:
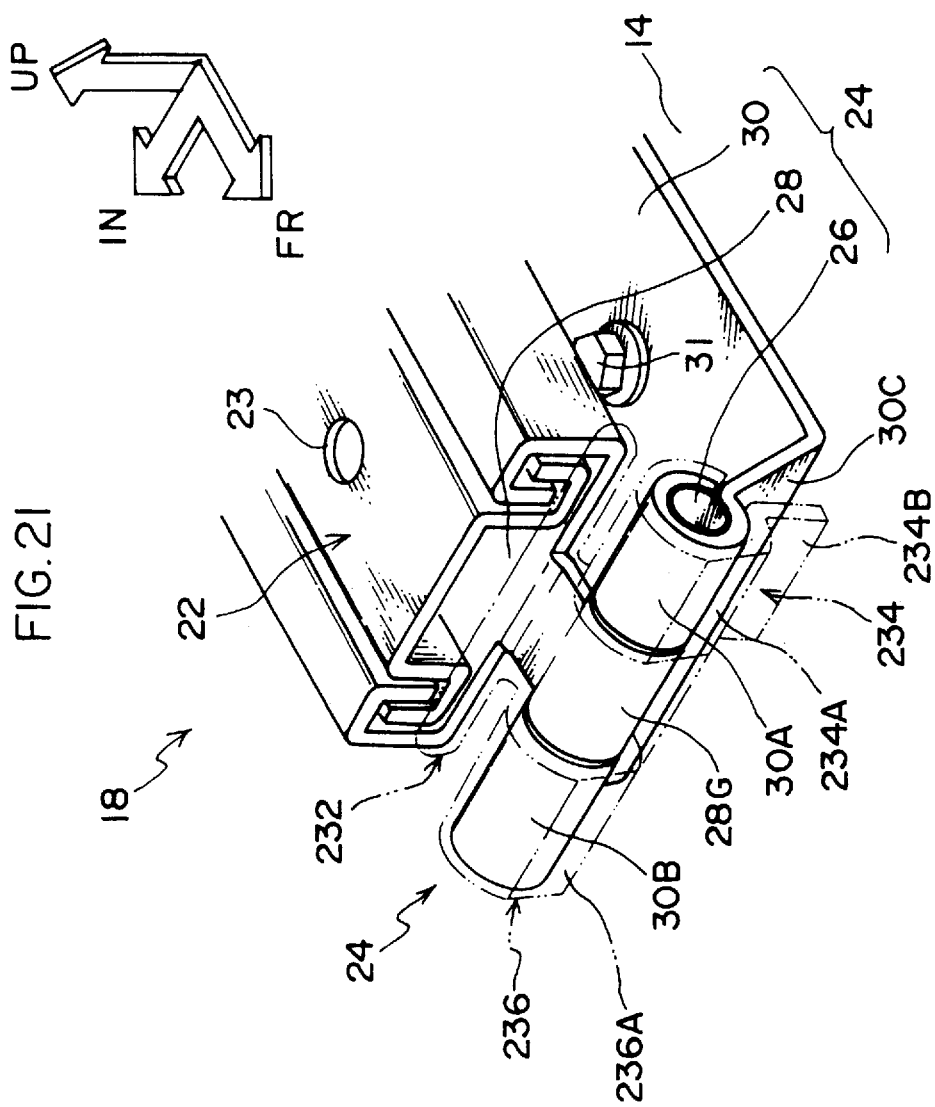
FIG. 21 is a perspective view showing a rotary slide mechanism of the rear seat apparatus according to the fifth embodiment as viewed from the front of the vehicle and at a diagonal.

As shown in FIG. 21, the rotary slide mechanism 18 is composed of a rail 22, which is mounted to the bottom portion of each of the rear seat cushions 212A, 212B, and 212C, and a hinge portion 24, which is mounted onto the floor 14.

A plurality of mounting holes 23 are formed in the rail 22. Using bolts (not shown) inserted into the mounting holes 23, the rail 22 is fixed onto each of the rear seat cushions 212A, 212B, and 212C such that it extends in the longitudinal direction of the vehicle. The hinge portion 24 has a pin 26 serving as connection means and extending in the widthwise direction of the vehicle, an upper plate 28 to which the rail 22 is slidably mounted, and a lower plate 30. A cylindrically formed front end portion 28G of the upper plate 28 is connected via the pin 26 with a pair of cylindrically formed front end portions 30A and 30B of the lower plate 30. Accordingly, the upper plate 28 is pivotable about the pin 26 with respect to the lower plate 30.

Unillustrated mounting holes are formed in the lower plate 30. The lower plate 30 is fixed onto the floor 14 using bolts 31 inserted through the mounting holes.

In the normal state of use, the rear portion of the rear seat cushion 212 is locked to the floor 14. By providing a plurality of locks, the rear seat cushion 212 is slidable when the rear seat cushion 212 is used in the normal state.

Figure 22:
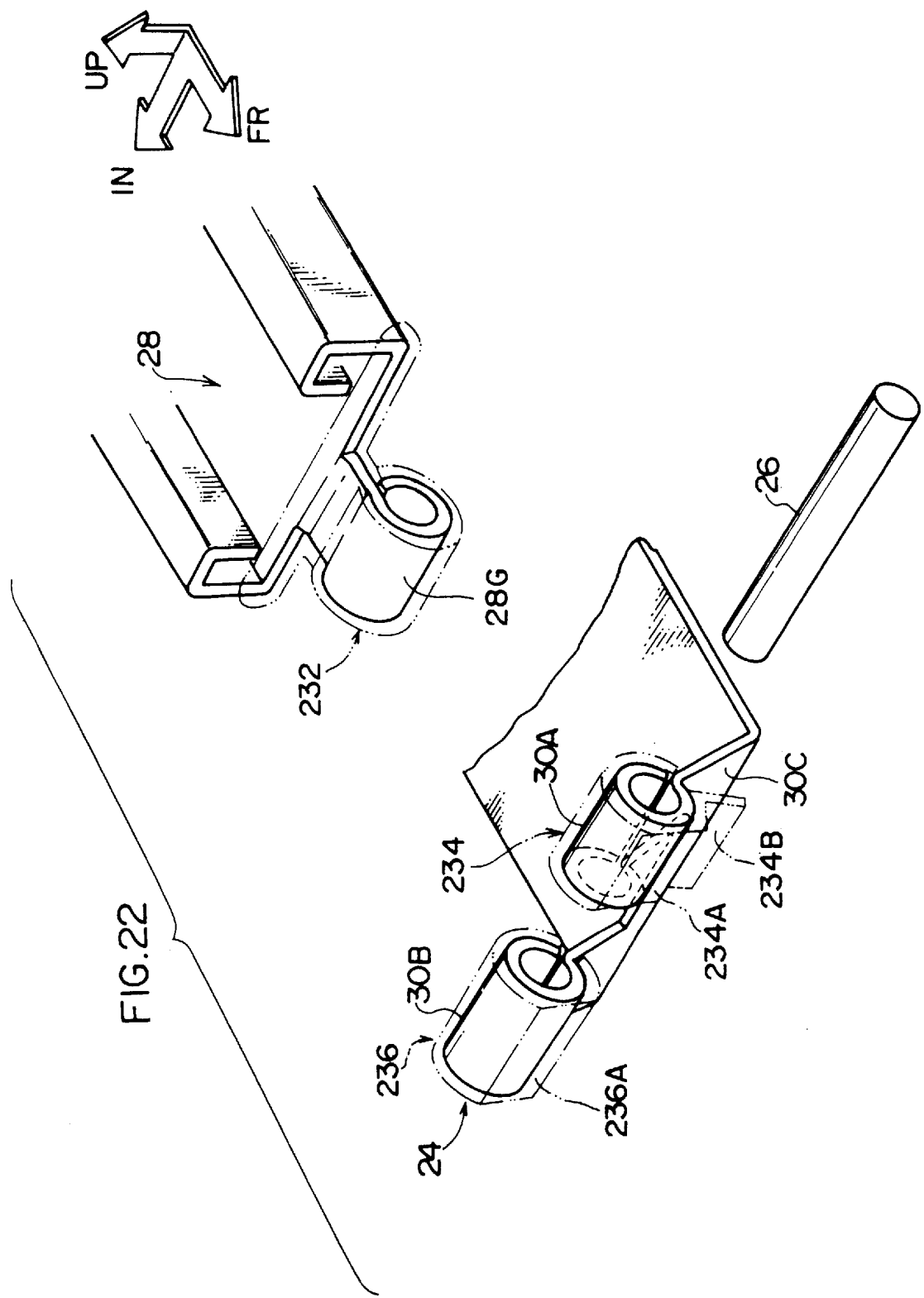
FIG. 22 is an exploded perspective view showing the rotary slide mechanism of the rear seat apparatus according to the fifth embodiment as viewed from the front of the vehicle and at a diagonal.

As shown in FIG. 22, the front end portion 28G and its periphery of the upper plate 28 is covered with an upper plate cover 232 illustrated by the two dots-and-dash line. The front end portion 30A of the lower plate 30 located outside in the widthwise direction of the vehicle is covered with a lower plate cover outer 234 illustrated by the two dots-and-dash line in FIG. 22 and being C-shaped as viewed from its side. The lower plate cover outer 234 serves as stopper means. The front end portion 30B of the lower plate 30 located inside in the widthwise direction of the vehicle is covered with a lower plate cover inner 236 illustrated by the two dots-and-dash line in FIG. 22 and being C-shaped as viewed from its side. The lower plate cover inner 236 also serves as stopper means.

Figure 19:
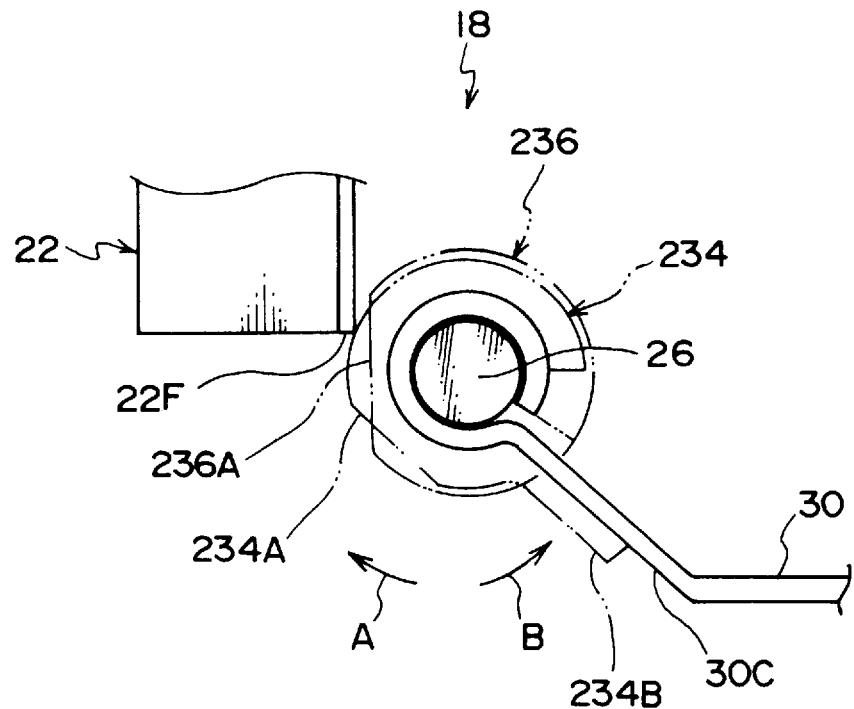
FIG. 19 is a schematic side view illustrating a movement to the overturned state of a rear seat apparatus for a vehicle according to a fifth embodiment of the present invention.

As shown in FIG. 19, the diameter of the lower plate cover outer 234 is slightly smaller than that of the lower plate cover inner 236. The lower plate cover inner 236 is fixed onto the front end portion 30B of the lower plate 30.

The lower plate cover inner 236 has a chamfered portion 236A formed at the circumferential front portion thereof. The chamfered portion 236A serves as canceling means. The lower plate cover outer 234 is attached to the front end portion 30A of the lower plate 30 such that it is pivotable about the pin 26 clockwise (in the direction of arrow A in FIG. 19) and counterclockwise (in the direction of arrow B in FIG. 19). Part of the circumference of the lower plate cover outer 234 is chamfered to form a chamfered portion 234A serving as canceling means. A lever portion 234B serving as an operating portion extends from the lower end portion of the lower plate cover outer 234 outwardly in the radial direction of the lower plate cover outer 234.

When the lower plate cover outer 234 is turned in the direction of arrow B by operating the lever portion 234B until the lever portion 234B abuts a slope surface 30C of the lower plate 30, the chamfered portion 234A of the lower plate cover outer 234 moves in the direction of arrow B away from the position corresponding to the position of the chamfered portion 236A of the lower plate cover inner 236. In this state as shown in FIG. 19, a front end portion 22F of the rail 22 abuts the circumferential portion of the lower plate cover outer 234, thereby preventing the rail 22 from moving downward.

Figure 20:
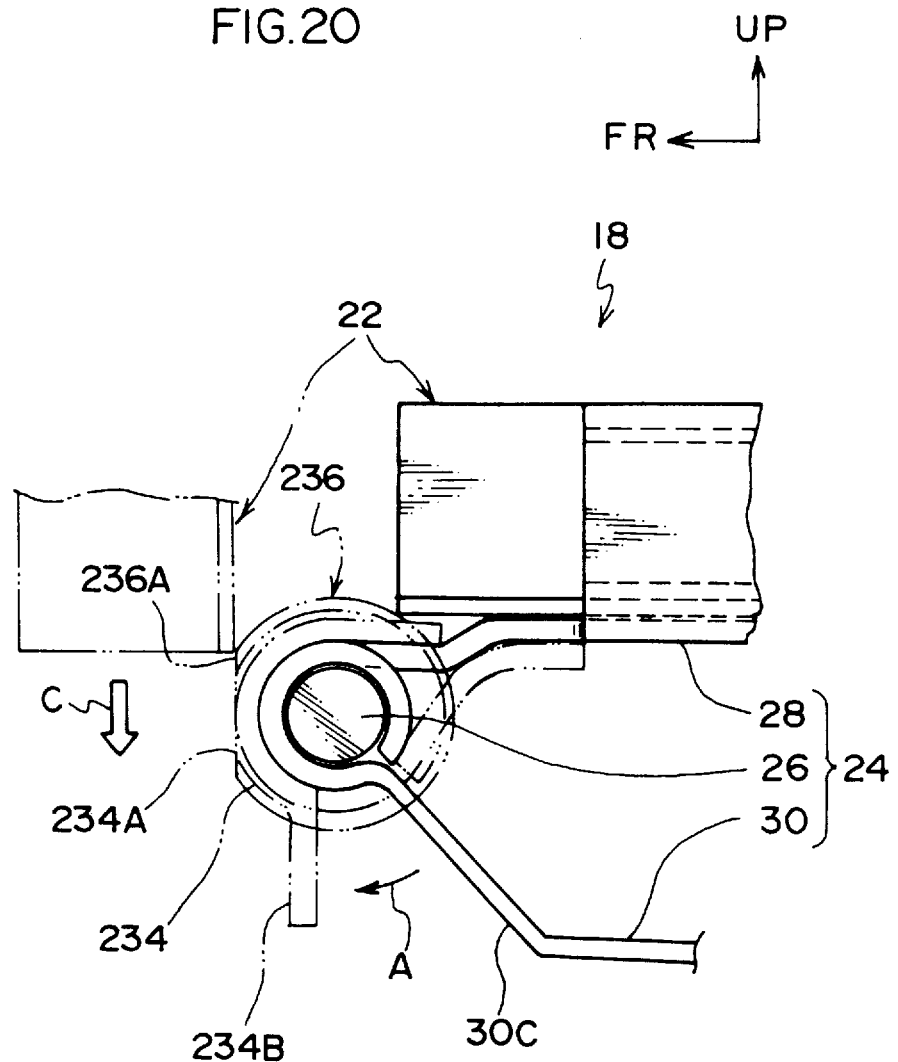
FIG. 20 is a schematic side view illustrating a movement to the upright state of the rear seat apparatus according to the fifth embodiment of the present invention.

As shown in FIG. 20, when the lower plate cover outer 234 is turned in the direction of arrow A by operating the lever portion 234B until the lever portion 234B reaches its perpendicular position, the position of the chamfered portion 234A of the lower plate cover outer 234 corresponds to that of the chamfered portion 236A of the lower plate cover inner 236. In this state as shown in FIG. 20, when the rail 22 is swung by approximately 90 degrees toward the front of the vehicle from the normal state of use illustrated by the solid line in FIG. 20 to the position illustrated by the two dots-and-dash line in FIG. 20, the rail 22 can slide downward (in the direction of arrow C) along the chamfered portion 234A of the lower plate cover outer 234 as well as the chamfered portion 236A of the lower plate cover inner 236.

As shown in FIG. 23, the center rear seat 210B is mounted on the front end portion of the floor surface 14A via a rotary slide mechanism 19. The rotary slide mechanism 19 allows the rear seat cushion 212 to swing by approximately 90 degrees toward the front of the vehicle and then to slide downward so that the front portion of the rear seat cushion 212 is held on a floor tunnel portion 240, thus entering the upright state (as illustrated by the solid line in FIG. 23). The level of the floor tunnel portion 240 is lower than the elevated rear portion of the stepped floor by half the height of the elevated rear portion of the floor from the unelevated front portion thereof. Since a console box 242 is located on the floor tunnel portion 240 and ahead of the center rear seat 210B, it is not necessary for the center rear seat 210B to further swing toward the front of the vehicle after being swung by approximately 90 degrees toward the front of the vehicle from the normal state of use. Accordingly, the rotary slide mechanism 19 is a modified rotary slide mechanism 18 in which both front end portions 30A and 30B of the lower plate 30 are provided with the lower plate cover inner 236. As a result, when the center rear seat 210B is swung by approximately 90 degrees toward the front of the vehicle, the center rear seat 210B always slides downward.

Next, the operation of the fifth embodiment will be described.

In the rear seat apparatus of the fifth embodiment, the rotary slide mechanisms 18 allow the corresponding rear seat cushions 212A and 212C of the left rear seat 210A and the right rear seat 210C to swing toward the front of the vehicle. In this case, as shown in FIG. 20, when the lower plate cover outer 234 is turned by operating the lever portion 234B of the lower plate cover outer 234 until the lever portion 234B reaches its perpendicular position, the position of the chamfered portion 234A of the lower plate cover outer 234 corresponds to that of the chamfered portion 236A of the lower plate cover inner 236. As a result, when the rail 22 fixed to the rear seat cushion 212 is swung by approximately 90 degrees toward the front of the vehicle from the normal state of use illustrated by the solid line in FIG. 20 to the position illustrated by the two dots-and-dash line in FIG. 20, the rail 22 slides downward (in the direction of arrow C) along the chamfered portion 234A of the lower plate cover outer 234 as well as the chamfered portion 236A of the lower plate cover inner 236.

Accordingly, after the right and left rear seat cushions 212C and 212A are swung by approximately 90 degrees toward the front of the vehicle, they can further slide downward to be held at the position (upright state) illustrated by the dot-and-dash line in FIG. 23. Thus, the right and left rear seat cushions 212C and 212A and the right and left rear seat backs 220C and 220A are held at a relatively low position, thereby facilitating loading/unloading an article from the front seat side.

When each of the rear seat cushions 212A and 212C of the left rear seat 210A and the right rear seat 210C is swung toward the front of the vehicle, the corresponding slide mechanism 18 acts as follows. As shown in FIG. 19, the lower plate cover outer 234 is first turned by operating the lever portion 234B of the lower plate cover outer 234 until the lever portion 234B abuts the slope surface 30C of the lower plate 30, so that the chamfered portion 234A of the lower plate cover outer 234 moves in the direction of arrow B away from the position corresponding to the position of the chamfered portion 236A of the lower plate cover inner 236. Thus, the front end portion 22F of the rail 22 abuts the circumferential portion of the lower plate cover outer 234, thereby preventing the rail 22 from moving downward.

Accordingly, in the left rear seat 210A as well as the right rear seat 210C of the rear seat apparatus of the fifth embodiment, it is possible to swing the rear seat cushions 212A and 212C while preventing them from sliding toward the center of swing, when the rear seat cushions 212A and 212C are swung by approximately 180 degrees toward the front of the vehicle. That is, when the lever portion 234B is abutted against the slope surface 30C of the lower plate 30, the chamfered portion 234A of the lower plate cover outer 234 moves in the direction of arrow B away from the position corresponding to the position of the chamfered portion 236A of the lower plate cover inner 236. Consequently, it becomes possible to swing the rear seat cushions 212A and 212C while preventing them from sliding toward the center of swing. Particularly, in the case of bringing the left rear seat 210A and the right rear seat 210C into the overturned state by swinging them by approximately 180 degrees toward the front of the vehicle, it becomes possible to prevent the rear seat cushions 212A and 212C from sliding downward, which would otherwise occur when the rear seat cushions 212A and 212C are swung toward the front of the vehicle by approximately 90 degrees toward the front of the vehicle. Accordingly, the operation for swinging the rear seat cushions 212A and 212C toward the front of the vehicle becomes easier.

In the right and left rear seats 210C and 210A of the rear seat apparatus of the fifth embodiment, by operating the lever portion 234B of the lower plate cover outer 234, the position of the chamfered portion 234A of the lower plate cover outer 234 and the position of the chamfered portion 236A of the lower plate cover inner 236 are relatively shifted from each other, thereby controlling the downward movement of the rear seat cushions 212A and 212C. Thus, the structure can be simplified. Further, since in addition to the upper plate cover 232, the lower plate cover outer 234 as well as the lower plate cover inner 236 cover the hinge portion 24 of the rotary slide mechanism 18, the hinge portion 24 of the rotary slide mechanism 18 does not directly contact the leg portion of a passenger.

A sixth embodiment of a rear seat apparatus for a vehicle of the present invention will now be described with reference to FIG. 24.

The members identical to those of the fifth embodiment are denoted by the same reference numerals, and their description will be omitted.

Figure 24:
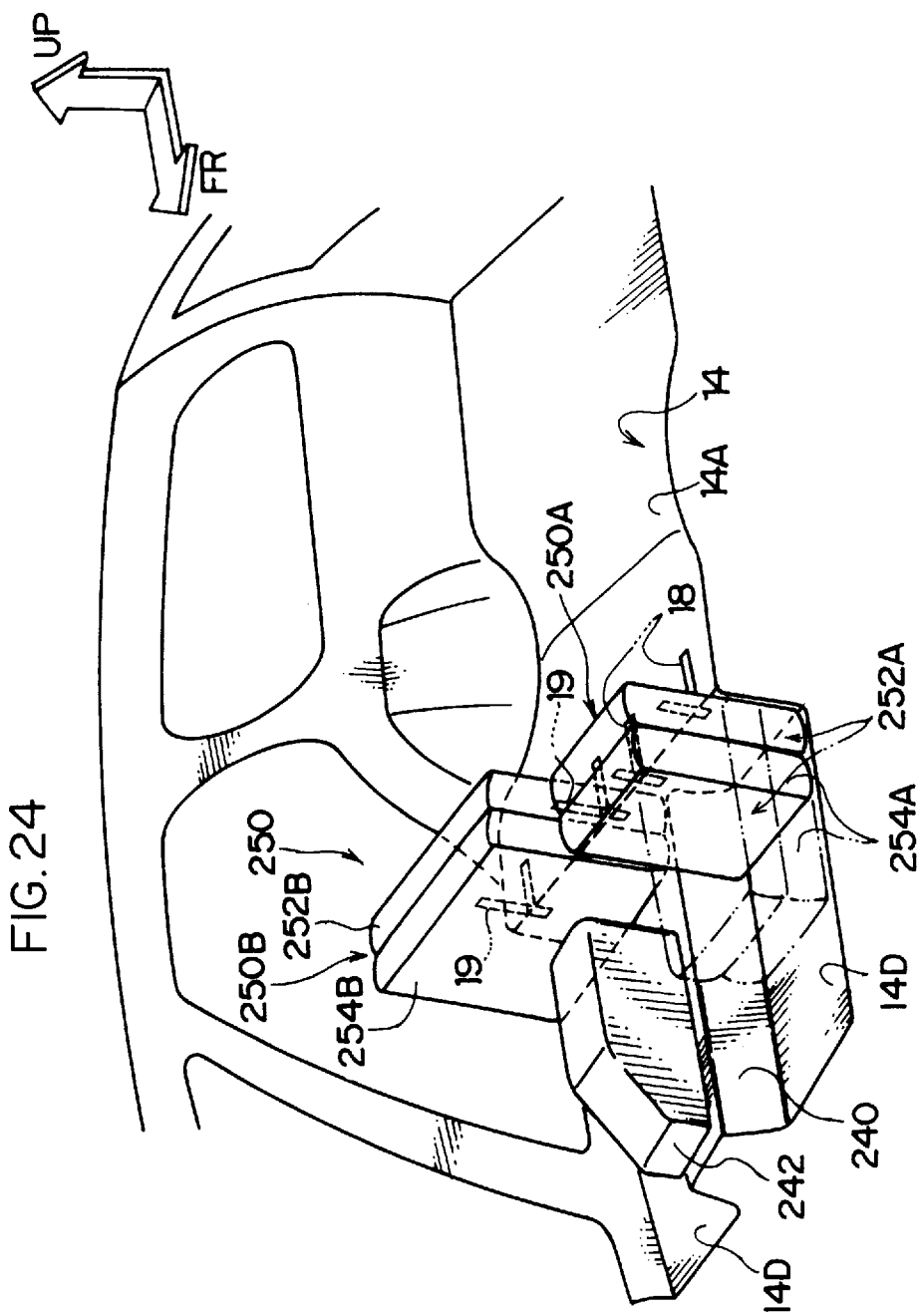
FIG. 24 is a perspective view showing the interior of a vehicle containing a rear seat apparatus for a vehicle according to a sixth embodiment of the present invention as viewed from the front of the vehicle and at a diagonal.

As shown in FIG. 24, a rear seat 250 of the sixth embodiment is divided in the widthwise direction of the vehicle at the ratio of approximately 4:6 into a left rear seat 250A and a right rear seat 250B. A left rear seat cushion 252A of the left rear seat 250A is mounted on the front end portion of the floor surface 14A via the rotary slide mechanism 18 of the fifth embodiment. The rotary slide mechanism 18 allows the left rear seat cushion 252A to swing by approximately 90 degrees toward the front of the vehicle and then to slide downward so that the front portion of the left rear seat cushion 252A is held on the floor surface 14D of the front lower-level portion of the floor, thus entering the upright state (as illustrated by the solid line in FIG. 24). The rotary slide mechanism 18 also allows the left rear seat cushion 252A to swing by approximately 180 degrees toward the front of the vehicle, thus entering the overturned state (as illustrated by the two dots-and-dash line in FIG. 24).

A right rear seat cushion 252B of the right rear seat 250B is mounted on the front end portion of the floor surface 14A via the rotary slide mechanism 19 of the fifth embodiment. The rotary slide mechanism 19 allows the right rear seat cushion 252B to swing by approximately 90 degrees toward the front of the vehicle and then to slide downward so that the front portion of the rear seat cushion is held on a floor tunnel portion 240, thus entering the upright state (as illustrated by the solid line in FIG. 24). The level of the floor tunnel portion 240 is lower than the elevated rear portion of the stepped floor by half the height of the elevated rear portion of the floor from the unelevated front portion thereof.

Each of the rear seat backs 254A and 254B is mounted via an unillustrated hinge portion to the rear portion of each of the rear seat cushions 252A and 252B such that it can swing forward.

Next, the operation of the sixth embodiment will be described.

In the left rear seat 250A of the sixth embodiment, it is possible to prevent the left rear seat cushion 252A from sliding downward when the left rear seat cushion 252A is swung by approximately 180 degrees toward the front of the vehicle. That is, when the lower plate cover outer 234 is turned in the direction of arrow B by operating the lever portion 234B until the lever portion 234B abuts the slope surface 30C of the lower plate 30, it becomes possible to swing the left rear seat cushion 252A while preventing the left rear seat cushion 252A from sliding toward the center of swing. Particularly, in the case of bringing the left rear seat cushion 252A into the overturned state by swinging it by approximately 180 degrees toward the front of the vehicle, it becomes possible to prevent the left rear seat cushion 252A from sliding downward, which would otherwise occur when the left rear seat cushion 252A is swung by approximately 90 degrees toward the front of the vehicle. Accordingly, the operation for swinging the left rear seat cushion 252A toward the front of the vehicle becomes easier.

In the left rear seat 250A of the rear seat apparatus of the sixth embodiment, by operating the lever portion 234B of the lower plate cover outer 234, the position of the chamfered portion 234A of the lower plate cover outer 234 and the position of the chamfered portion 236A of the lower plate cover inner 236 are relatively shifted from each other, thereby controlling the downward movement of the left rear seat cushion 252A. Thus, the structure can be simplified. Further, since in addition to the upper plate cover 232, the lower plate cover outer 234 as well as the lower plate cover inner 236 cover the hinge portion 24 of the rotary slide mechanism 18, the hinge portion 24 of the rotary slide mechanism does 18 not directly contact the leg portion of a passenger.

A seventh embodiment of a rear seat apparatus for a vehicle of the present invention will now be described with reference to FIG. 25.

The members identical to those of the fifth embodiment are denoted by the same reference numerals, and their description will be omitted.

Figure 25:
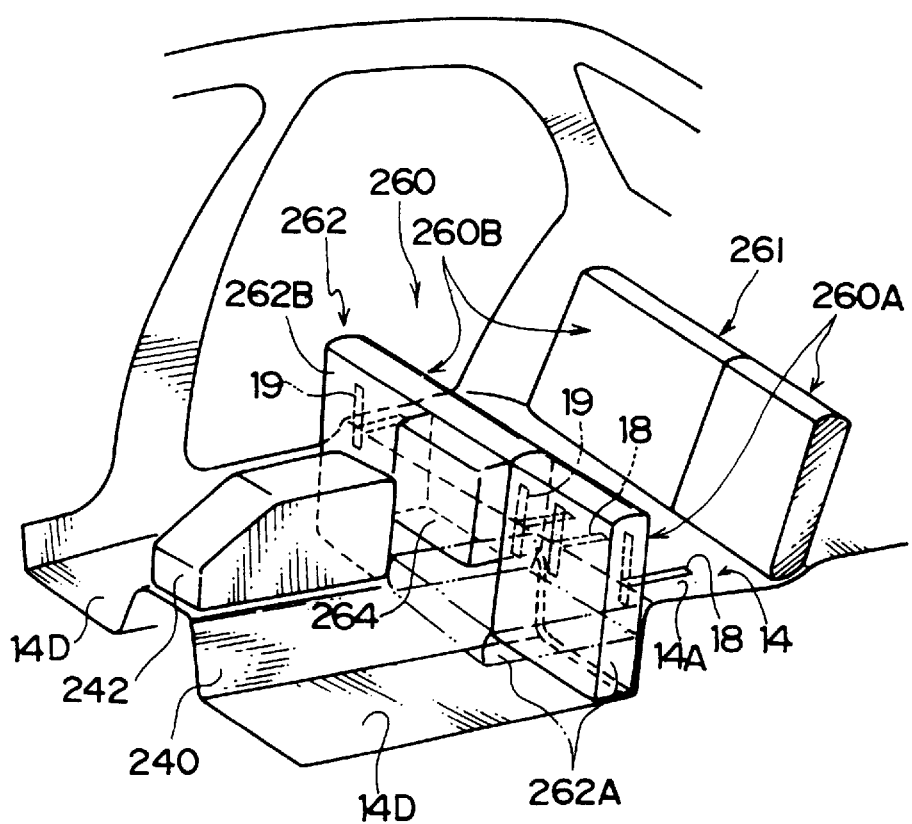
FIG. 25 is a perspective view showing the interior of a vehicle containing a rear seat apparatus for a vehicle according to a seventh embodiment of the present invention as viewed from the front of the vehicle and at a diagonal.
Figure 26:
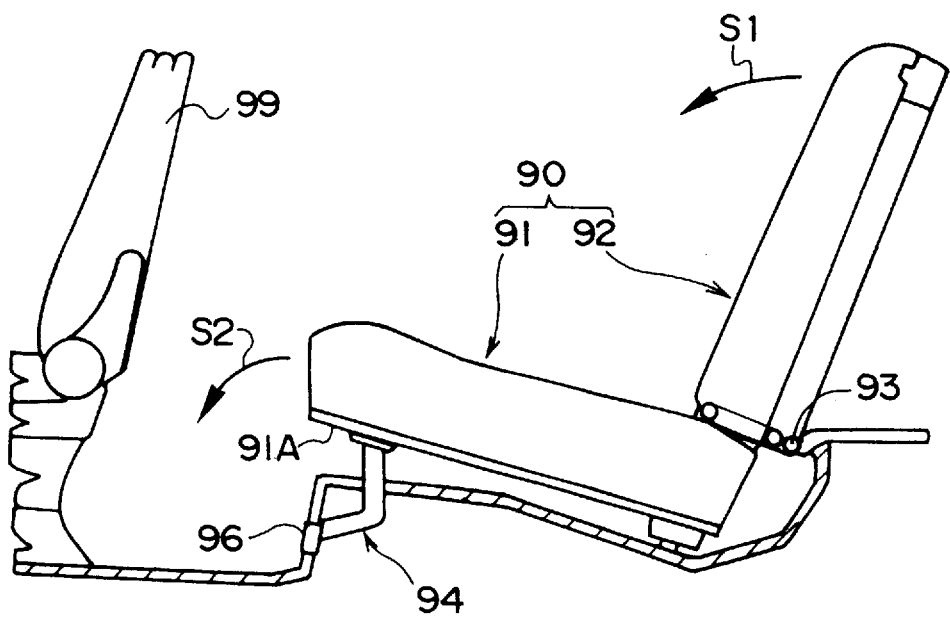
FIG. 26 is a schematic side view showing the seating state of a conventional rear seat apparatus for a vehicle.
Figure 27:
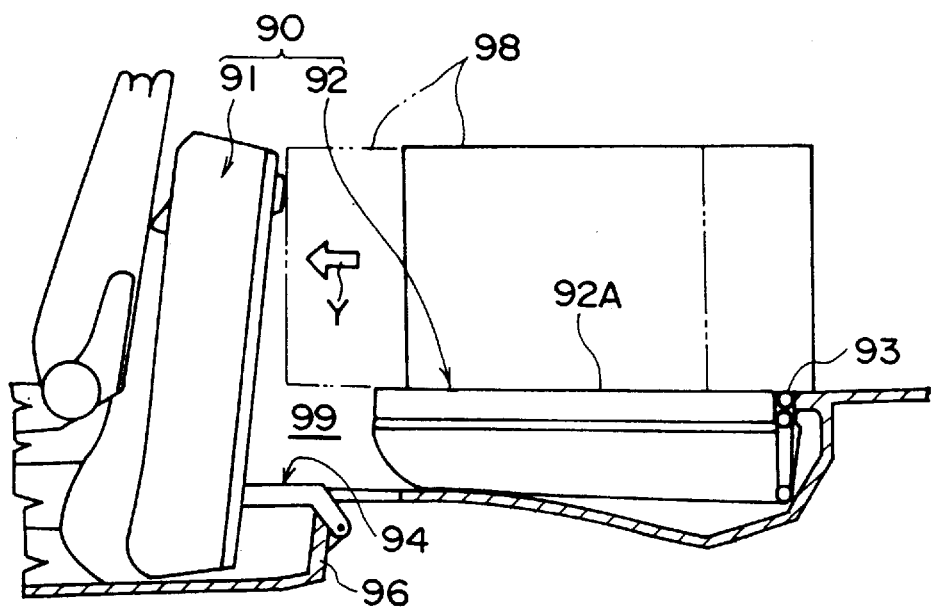
FIG. 27 is a schematic side view showing the conventional rear seat apparatus wherein a rear seat cushion is upright and a rear seat back is folded toward the front of the vehicle.

As shown in FIG. 25, in a rear seat 260 of the seventh embodiment, a rear seat back 261 is mounted on the floor surface 14A of the elevated rear portion of the floor 14 and is separated from a rear seat cushion 262.

The rear seat 260 is divided in the widthwise direction of the vehicle at the ratio of approximately 4:6 into a left rear seat 260A and a right rear seat 260B. A left rear seat cushion 262A of the left rear seat 260A is mounted on the front end portion of the floor surface 14A via the rotary slide mechanism 18 of the fifth embodiment. The rotary slide mechanism 18 allows the left rear seat cushion 262A to swing by approximately 90 degrees toward the front of the vehicle and then to slide downward so that the front portion of the left rear seat cushion 262A is held on the floor surface 14D of the front lower-level portion of the floor, thus entering the upright state (as illustrated by the solid line in FIG. 25). The rotary slide mechanism 18 also allows the left rear seat cushion 262A to swing by approximately 180 degrees toward the front of the vehicle, thus entering the overturned state (as illustrated by the two dots-and-dash line in FIG. 25).

A right rear seat cushion 262B of the right rear seat 260B is mounted on the front end portion of the floor surface 14A via the rotary slide mechanism 19 of the fifth embodiment. The rotary slide mechanism 19 allows the right rear seat cushion 262B to swing by approximately 90 degrees toward the front of the vehicle and then to slide downward so that the front portion of the rear seat cushion is held on a floor tunnel portion 240, thus entering the upright state (as illustrated by the solid line in FIG. 25). The level of the floor tunnel portion 240 is lower than the elevated rear portion of the stepped floor by half the wall height of the stepped portion of the floor.

A child seat portion 264 is formed on the right rear cushion 262B of the right rear seat 260B at a position corresponding to the top portion of the floor tunnel portion 240. Through an unillustrated hinge, this child seat portion 264 can be folded onto the seating surface of the right rear seat cushion 262B. Thus, by folding the child seat portion 264 onto the right rear seat cushion 262B as illustrated by the solid line in FIG. 25, the child seat portion 264 can be prevented from interfering with the floor tunnel portion 240. The height of the right rear seat cushion 262B in its upright state is set substantially identical to that of the left rear seat cushion 262A in its upright state.

In the left rear seat 260A of the seventh embodiment, it is possible to swing the left rear seat cushion 262A while preventing the left rear seat cushion 262A from sliding toward the center of swing, when the left rear seat cushion 262A is swung by approximately 180 degrees toward the front of the vehicle via the slide mechanism 18, when the lower plate cover outer 234 is turned in the direction of arrow B by operating the lever portion 234B until the lever portion 234B abuts the slope surface 30C of the lower plate 30, it becomes possible to swing the left rear seat cushion 262A while preventing the left rear seat cushion 262A from sliding toward the center of swing. Particularly, in the case of bringing the left rear seat cushion 262A into the overturned state by swinging it by approximately 180 degrees toward the front of the vehicle, it becomes possible to prevent the left rear seat cushion 262A from sliding downward, which would otherwise occur when the left rear seat cushion 262A is swung by approximately 90 degrees toward the front of the vehicle. Accordingly, the operation for swinging the left rear seat cushion 262A toward the front of the vehicle becomes easier.

In the left rear seat 260A of the rear seat apparatus of the seventh embodiment, by operating the lever portion 234B of the lower plate cover outer 234, the position of the chamfered portion 234A of the lower plate cover outer 234 and the position of the chamfered portion 236A of the lower plate cover inner 236 are relatively shifted from each other, thereby controlling the downward movement of the left rear seat cushion 262A. Thus, the structure can be simplified. Further, since in addition to the upper plate cover 232, the lower plate cover outer 234 as well as the lower plate cover inner 236 cover the hinge portion 24 of the rotary slide mechanism 18, the hinge portion 24 of the rotary slide mechanism 18 does not directly contact the leg portion of a passenger.

While the present invention has been described with reference to the various embodiments, the present invention should not be construed as being limited to the embodiments. It is apparent to those skilled in the art that the present invention may be practiced in many other forms without departing from the scope of the invention.

What is claimed is:

1. A rear seat apparatus for a vehicle disposed on a rear elevated portion of a stepped floor of the vehicle and allowing at least a rear seat cushion, which is a portion of the rear seat apparatus, to swing toward the front of the vehicle from a horizontal seating state, in which a passenger may sit on the rear seat cushion, said rear seat apparatus comprising:

a connection mechanism for connecting said rear seat cushion to the rear elevated portion of the floor of the vehicle, said connection mechanism allowing said rear seat cushion to be moved by approximately 90 degrees toward the front of the vehicle and then slid downward so as to be brought into an upright state, in which a front portion of said rear seat cushion is held on a front lower-level portion of the floor of the vehicle, and also allowing said rear seat cushion to be moved by approximately 180 degrees from said seating state toward the front of the vehicle so as to be brought into an overturned state, wherein said connection mechanism is a rotary slide mechanism disposed at the floor of the vehicle and on said rear seat cushion, and said rotary slide mechanism includes a rail mounted to said rear seat cushion, a lower plate mounted on the floor, a rail guide plate for guiding said rail, and connection means for pivotally connecting a front end portion of said rail guide plate with a front end portion of said lower plate.

2. A rear seat apparatus for a vehicle according to claim 1, wherein a rear seat back is hinged to said rear seat cushion such that said rear seat back can be folded onto said rear seat cushion, and can, together with said rear seat cushion, be brought into said upright state or said overturned state.

3. A rear seat apparatus for a vehicle according to claim 2, further comprising a headrest having a headrest stay and wherein a guide portion for insertion of the headrest stay is provided at a rear end portion of said rear seat cushion as well as at a lower portion of said rear seat back, and wherein in a state in which said rear seat cushion and said rear seat back are set in an overturned state by being rotated substantially 180 degrees toward the front of the vehicle, said headrest stay is inserted in both of said guide portions, thereby fixing said rear seat cushion and said rear seat back.

4. A rear seat apparatus for a vehicle according to claim 3, wherein a rear surface of said headrest has a contour substantially matching a contour of the rear surface of a front seat back.

5. A rear seat apparatus for a vehicle according to claim 1, wherein a rear seat back is hinged to the vehicle body whereby when said rear seat cushion is in said upright state or said overturned state, said rear seat back can be displaced so as to be disposed on a rear portion of the floor.

6. A rear seat apparatus for a vehicle according to claim 1, further comprising:

changeover means for selectively hinging a rear seat back to one of said rear seat cushion and the body of the vehicle.

7. A rear seat apparatus for a vehicle according to claim 6, wherein said rear seat back is divided into a right divisional portion and a left divisional portion, which are independently swung by said changeover means.

8. A rear seat apparatus for a vehicle according to claim 1, wherein said rotary slide mechanism has second connection means for pivotably connecting a rear end portion of said rail guide plate and a front end portion of said rail.

9. A rear seat apparatus for a vehicle according to claim 8, wherein when said rear seat cushion is in said overturned state, one end of said rear seat cushion is supported by a headrest inserted into a guide portion for insertion of a headrest stay provided at a lower portion of a front seat.

10. A rear seat apparatus for a vehicle according to claim 1, wherein said rail and said rail guide plate have a substantially U-shaped cross-section whose opening faces downward when said rear seat cushion is in said seating state, and both end portions of said rail, which define said opening, are bent upward so as to project upward beyond bottom ends of a sliding portion of said rail guide plate, thereby forming respective bent portions such that said rail guide plate is slidably housed within said rail.

11. A rear seat apparatus for a vehicle according to claim 10, wherein a protector is attached to each of widthwise peripheral surfaces of said rail, said protectors are sandwiched between said rail and a seat frame together with a seat covering for covering a cushion pad formed integrally by foaming with said seat frame, and said rail is fixed to said seat frame by fixing means.

12. A rear seat apparatus for a vehicle according to claim 11, wherein movement of the front end of said rail is restricted by front walls of said protectors.

13. A rear seat apparatus for a vehicle according to claim 1, wherein a rear seat back is hinged to said rear seat cushion such that said rear seat back can be folded onto said rear seat cushion, or can, together with said rear seat cushion, be brought into said upright state or said overturned state.

14. A rear seat apparatus for a vehicle according to claim 13, further comprising a headrest having a headrest stay and wherein a guide portion for insertion of the headrest stay is provided at a rear end portion of said rear seat cushion as well as at a lower portion of said rear seat back, and wherein in a state in which said rear seat cushion and said rear seat back are set in an overturned state by being rotated substantially 180 degrees toward the front of the vehicle, said headrest stay is inserted into said guide portions.

15. A rear seat apparatus for a vehicle according to claim 14, wherein the rear surface of said headrest has a shape corresponding to the shape of the rear surface of a front seat back.

16. A rear seat apparatus for a vehicle according to claim 1, wherein a rear seat back is hinged to the vehicle body such that said rear seat back is allowed to be folded onto the rear portion of the floor when said rear seat cushion is in said upright state or said overturned state.

17. A rear seat apparatus for a vehicle according to claim 1, further comprising:

changeover means for selectively hinging a rear seat back to one of said rear seat cushion and the body of the vehicle.

18. A rear seat apparatus for a vehicle disposed on a rear elevated portion of a stepped floor of the vehicle, wherein at least a rear seat cushion of said rear seat apparatus is adapted to be moved by approximately 90 degrees from a seating state toward the front of the vehicle and then slide downward so that said rear seat cushion is brought into an upright state, in which a front portion of the rear seat cushion is held on a front lower-level portion of the floor of the vehicle, and said rear seat cushion is also allowed to be moved by approximately 180 degrees from said seating state toward the front of the vehicle so that said rear seat cushion is overturned to enter an overturned state, said rear seat apparatus comprising:

a rotary slide mechanism for connecting said rear seat cushion and the rear portion of the floor, said rotary slide member having stopper means for preventing said rear seat cushion from sliding downward when said rear seat cushion is swung by approximately 90 degrees, and canceling means for canceling the prevention of sliding of said rear seat cushion so that said rear seat cushion is allowed to slide downward.

19. A rear seat apparatus for a vehicle according to claim 18, wherein said rotary slide mechanism includes a rail and an upper plate which are both attached to said rear seat cushion, a lower plate attached onto the floor, a hinge structure for pivotably connecting a front end portion of said upper plate and a front end portion of said lower plate, an upper plate cover, and two lower plate covers, said upper and lower plate covers covering said hinge structure.

20. A rear seat apparatus for a vehicle according to claim 17, wherein said canceling means comprises a chamfered portion provided on each of said two lower plate covers.

21. A rear seat apparatus for a vehicle according to claim 19, wherein said stopper means comprises an operating portion provided on one of said two lower plate covers.

22. A rear seat apparatus for a vehicle according to claim 1, wherein said connection mechanism is provided such that said rear seat cushion is moved downward from the state of being rotated substantially 90 degrees toward the front of the vehicle from the seating state, and the front portion of the rear seat cushion is slid downwardly until it abuts the front lower-level portion of the floor.

23. The rear seat apparatus for a vehicle according to claim 10, wherein the rail has sliding surfaces for supporting the weight of the seat when the rear seat cushion is in the seating state and when the rear seat cushion is overturned 180 degrees forward.

* * * * *